US010803152B1

(12) United States Patent
Page et al.

(10) Patent No.: US 10,803,152 B1
(45) Date of Patent: Oct. 13, 2020

(54) SYSTEM AND METHOD FOR SYNCHRONIZING ACCOUNT INFORMATION ON TWO DIFFERENT COMPUTER SYSTEMS COUPLED VIA A NETWORK

(71) Applicant: Charles Schwab & Co., Inc., San Francisco, CA (US)

(72) Inventors: William Page, San Francisco, CA (US); Brian Shenson, Lafayette, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 433 days.

(21) Appl. No.: 13/775,087

(22) Filed: Feb. 22, 2013

Related U.S. Application Data

(63) Continuation-in-part of application No. 13/686,688, filed on Nov. 27, 2012, and a continuation-in-part of application No. 13/686,704, filed on Nov. 27, 2012.

(60) Provisional application No. 61/601,988, filed on Feb. 22, 2012, provisional application No. 61/563,814, filed on Nov. 27, 2011.

(51) Int. Cl.
*H04L 29/06* (2006.01)
*G06F 21/31* (2013.01)

(52) U.S. Cl.
CPC .................................. *G06F 21/31* (2013.01)

(58) Field of Classification Search
None
See application file for complete search history.

(56) References Cited

U.S. PATENT DOCUMENTS

| 6,088,451 | A  | * | 7/2000  | He ......................... H04L 63/20 380/255 |
| 8,056,121 | B2 | * | 11/2011 | Hamilton, II ......... H04L 67/306 713/182 |
| 8,307,425 | B2 | * | 11/2012 | Gaya ..................... G06F 21/604 380/229 |
| 8,429,708 | B1 | * | 4/2013  | Tandon .................. G06F 21/00 380/247 |
| 8,499,147 | B2 | * | 7/2013  | Ikeda ..................... G06F 21/32 713/155 |
| 8,819,814 | B1 | * | 8/2014  | Leach .................... H04L 63/08 709/202 |
| 9,020,854 | B2 | * | 4/2015  | Giobbi ........... H04W 12/04031 705/55 |
| 2006/0123472 | A1 | * | 6/2006 | Schmidt ................. H04L 63/08 726/8 |

(Continued)

OTHER PUBLICATIONS

Rieger, Sebastian. Using Federated Identities to access IP-protected Web Resources in Multi-Customer Environments. 2010 Fifth International Conference on Internet and Web Applications and Services. https://ieeexplore.ieee.org/stamp/stamp.jsp?tp=&arnumber=5476496 (Year: 2010).*

(Continued)

*Primary Examiner* — Jeremiah L Avery
(74) *Attorney, Agent, or Firm* — Innovation Partners; Charles E. Gotlieb

(57) ABSTRACT

A system and method synchronizes accounts across different computer systems using a matching computer system and a network, when the accounts on the source computer system are organized differently than they are on the destination computer system.

15 Claims, 7 Drawing Sheets

(56) References Cited

U.S. PATENT DOCUMENTS

| | | | | |
|---|---|---|---|---|
| 2006/0242273 | A1* | 10/2006 | Fiducci | H04L 63/083 709/220 |
| 2007/0250920 | A1* | 10/2007 | Lindsay | G06F 21/31 726/7 |
| 2008/0031447 | A1* | 2/2008 | Geshwind | H04L 9/0822 380/46 |
| 2009/0144546 | A1* | 6/2009 | Jancula | H04L 63/0428 713/168 |
| 2011/0265147 | A1* | 10/2011 | Liu | H04L 63/08 726/4 |
| 2011/0277016 | A1* | 11/2011 | Hockings | H04L 9/321 726/4 |
| 2012/0173348 | A1* | 7/2012 | Yoo | G06Q 20/10 705/16 |

OTHER PUBLICATIONS

Maler, Eve; Reed, Drummond. The Venn of Identity: Options and Issues in Federated Identity Management. IEEE Security & Privacy, vol. 6, Issue: 2. https://ieeexplore.ieee.org/stamp/stamp.jsp?tp=&arnumber=4489845 (Year: 2008).*

* cited by examiner

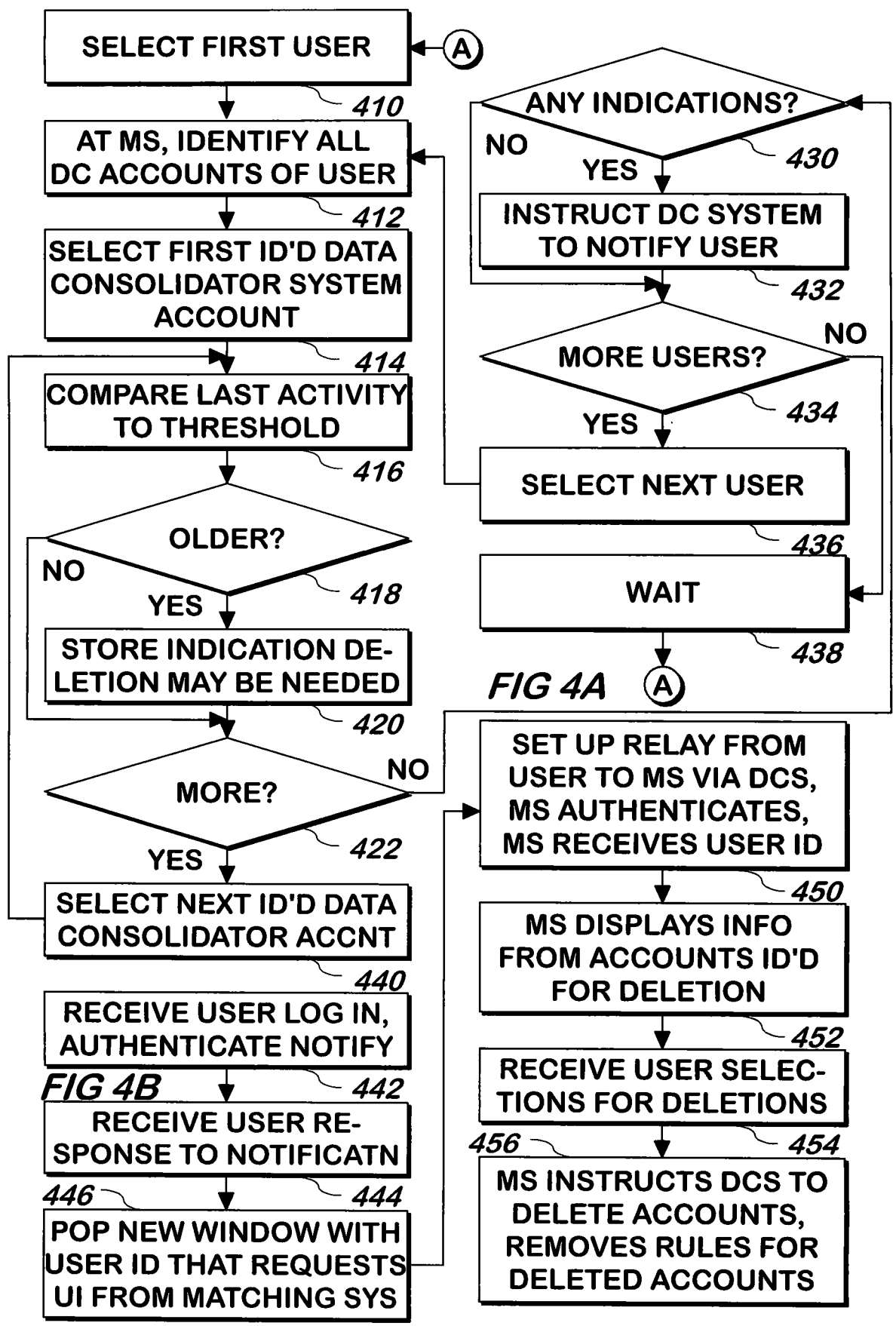

SYSTEM AND METHOD FOR SYNCHRONIZING ACCOUNT INFORMATION ON TWO DIFFERENT COMPUTER SYSTEMS COUPLED VIA A NETWORK

RELATED APPLICATIONS

This application claims the benefit of U.S. Provisional Patent Application Ser. No. 61/601,988 Entitled, "Method and Apparatus for Synchronizing Account Information on Two Different Computer Systems Coupled Via a Network filed by William Page on Feb. 22, 2012, and is a continuation in part of U.S. patent application Ser. No. 13/686,688 entitled "System and Method for Receiving Information Among Computer Systems Without Enabling Log Ins if the User Identifiers are Compromised" filed by William Page on Nov. 27, 2012, which claims the benefit of U.S. Provisional Patent Application Ser. No. 61/563,814 entitled, "Method and Apparatus for Receiving Information Among Computer Systems Without Enabling Log Ins if the User Identifiers are Compromised" filed on Nov. 27, 2011 by William Page, and is a continuation in part of U.S. patent application Ser. No. 13/686,704 entitled "System and Method for Receiving Information Among Computer Systems Without Enabling Log Ins if the User Identifiers are Compromised" filed by William Page on Nov. 27, 2012, which claims the benefit of U.S. Provisional Patent Application Ser. No. 61/563,814 entitled, "Method and Apparatus for Receiving Information Among Computer Systems Without Enabling Log Ins if the User Identifiers are Compromised" filed on Nov. 27, 2011 by William Page, each having the same assignee as this application and each is incorporated herein by reference in its entirety.

FIELD OF THE INVENTION

The present invention is related to computer software and more specifically to computer software for synchronization of accounts organized differently on different computer systems.

BACKGROUND OF THE INVENTION

Investment advisers may use a data consolidating system that consolidates information from one or more data providing systems, and optionally provides additional features not available on data providing systems that supply at least some of the information used on the data consolidating systems. The data providing system may have one or more accounts of clients of the investment advisor, and such data providing system accounts are associated with a user identifier of the investment advisor in order to allow the data provider system to enable access by the investment advisor to the information contained in those accounts. It can be desirable to transfer such information from one or more data provider systems into one or more data consolidator systems used by the investment advisor. What is needed is a system and method that can transfer information from one or more data provider systems into one or more data consolidator systems, while minimizing intervention required by the investment advisor.

SUMMARY OF INVENTION

A system and method enables individuals, who may be retail clients of a brokerage, and investment advisors, to register as users on one or more data providing systems. The system and method allows each investment advisor or other user having access to account information of one or more other users on the data providing system to register as a user on one or more data consolidating systems. A data consolidating system may include a system operating a conventional customer relationship management system, and a data providing system may include a conventional online brokerage system. On the data providing system, each account may be associated with a retail user who may be the owner of the assets in the account, one or more investment advisors, or both of these types of users. Changes may be made to the accounts on the data providing system, such as by the retail users, investment advisors, or both, initiating transactions involving those accounts, on an ongoing basis. Accounts may be added to the data providing system, or may be marked as deleted from the data providing system, each on an ongoing basis.

Accounts may be added to the data consolidating system by, and associated with, the investment advisor, and such accounts may be organized differently from the manner in which they are organized on the data providing system.

Rules that describe how to receive and interpret data from the data providing system, and how to modify or delete accounts on the data consolidating system, may be provided by a system administrator to a matching system. Such rules facilitate transferring account information on the data providing system to an account on the data consolidating system or inactivating or deleting an account on the data consolidating system that either corresponds to an inactivated or deleted account on the data providing system or has not had any activity for a threshold period of time. Specific data retrieval rules for each account advisor may be provided to the matching system by the investment advisor, along with information describing how to match account information from the data providing system to accounts on the data consolidating system for each investment advisor. Such matches may include unique matching information that ensures a unique match, and non-unique matching information that may or may not ensure a unique match, but has at least the potential for a non-unique match, such as a match from a data providing system account to multiple data consolidating system accounts, or vice versa. The investment advisor may also supply, or use defaults for, trigger information that describes under what circumstances the information should be transferred from the data providing systems to a data consolidating system.

Upon the occurrence of one of such triggers, the matching system, which may be separate from or the same as the data providing system or the data consolidating system, retrieves account information from the data providing systems that is associated with the investment advisor corresponding to the trigger and attempts to match the account identifiers or other information from the retrieved account information to the accounts on the data consolidating system set up by the investment advisor as described above using the matching information supplied by the investment advisor. Each uniquely matching data providing account modification is inserted into the corresponding data consolidating system, and each uniquely matched deletion or deletion indication, optionally causes the matching system to indicate that the matched account on the data consolidating system is deleted, and the matching system removes rules that would cause information retrieved from the data providing system to be uniquely matched to such deleted accounts on the data consolidating system. If there are non-unique matches for account information that was not uniquely matched by the matching system, such non-uniquely matched information is stored on the matching system pending additional investment advisor intervention, and a notification request is provided by the matching system to the data consolidating system corresponding to the trigger.

When the investment advisor logs into the data consolidating system, any such notifications are provided to that user by the data consolidating system. In one embodiment, the investment advisor may respond to the notification via a relay set up using a secure connection between the data consolidating system and the matching system and further communications between the user's computer system and the matching system use such data consolidating system relay. The matching system then displays not uniquely matched account information to the investment advisor and allows the investment advisor to designate a matching account on the data consolidating system for each piece of unmatched account information. The matching system then causes the unmatched account information to be synchronized with the specified account or accounts on the data consolidating system, and retains the matching account information so that subsequent account information may be automatically matched. In the case of unmatched information that is matched in a non-unique fashion, the system and method can identify to the investment advisor potentially matching accounts on the data consolidating system using the non-unique match rules to assist the investment advisor in performing the matching process.

As account information from the data providing system is matched into accounts on the data consolidating system the date and time of the last such match and the account identifier on the data consolidating system into which such information was synchronized is retained on the matching system. Periodically, the matching system identifies accounts on the data consolidating system to which account information from the data providing system has not been matched for at least a threshold amount of time. If any such accounts are identified, the system and method requests the data consolidating system to notify the user. As the user responds to such notification, such as via the data consolidating system relay described above, the matching system displays to the investment advisor the identifiers of such identified accounts and allows the investment advisor to indicate that such accounts on the data consolidating system should be deleted, marked as deleted, or inactivated. The matching system then instructs the data consolidating system to perform such actions with respect to such accounts, and removes from the matching system information that could be used to match account information subsequently received from the data consolidating system to such accounts.

Investment advisors and retail users are described herein, however any user of any to computer systems may be used in place of such described users.

BRIEF DESCRIPTION OF THE DRAWINGS

FIG. 4, consisting of FIGS. 4A and 4B, is a flowchart illustrating a method for synchronizing potential account deletions according to one embodiment of the present invention.

DETAILED DESCRIPTION OF A PREFERRED EMBODIMENT

Figure 1:
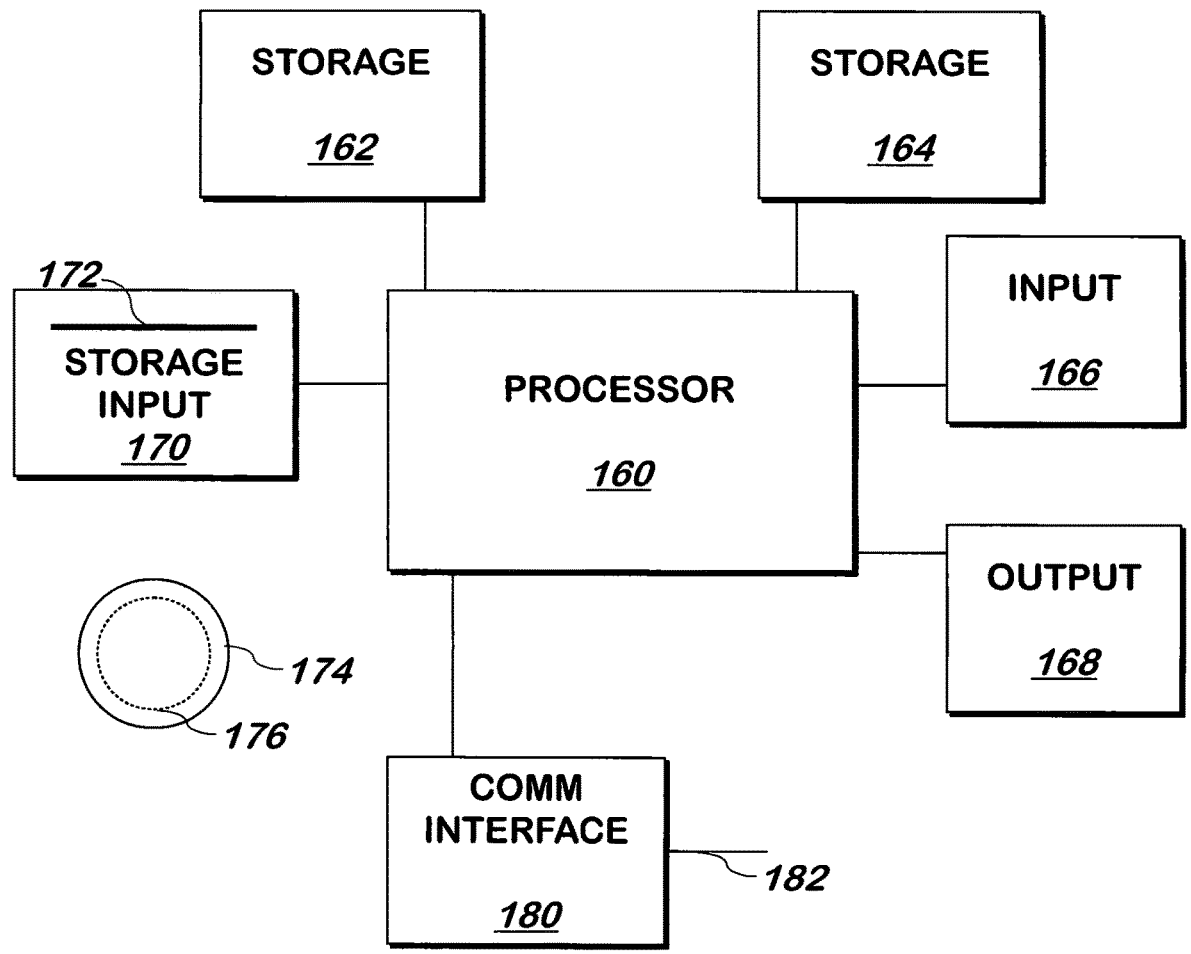
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif.

or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2A:
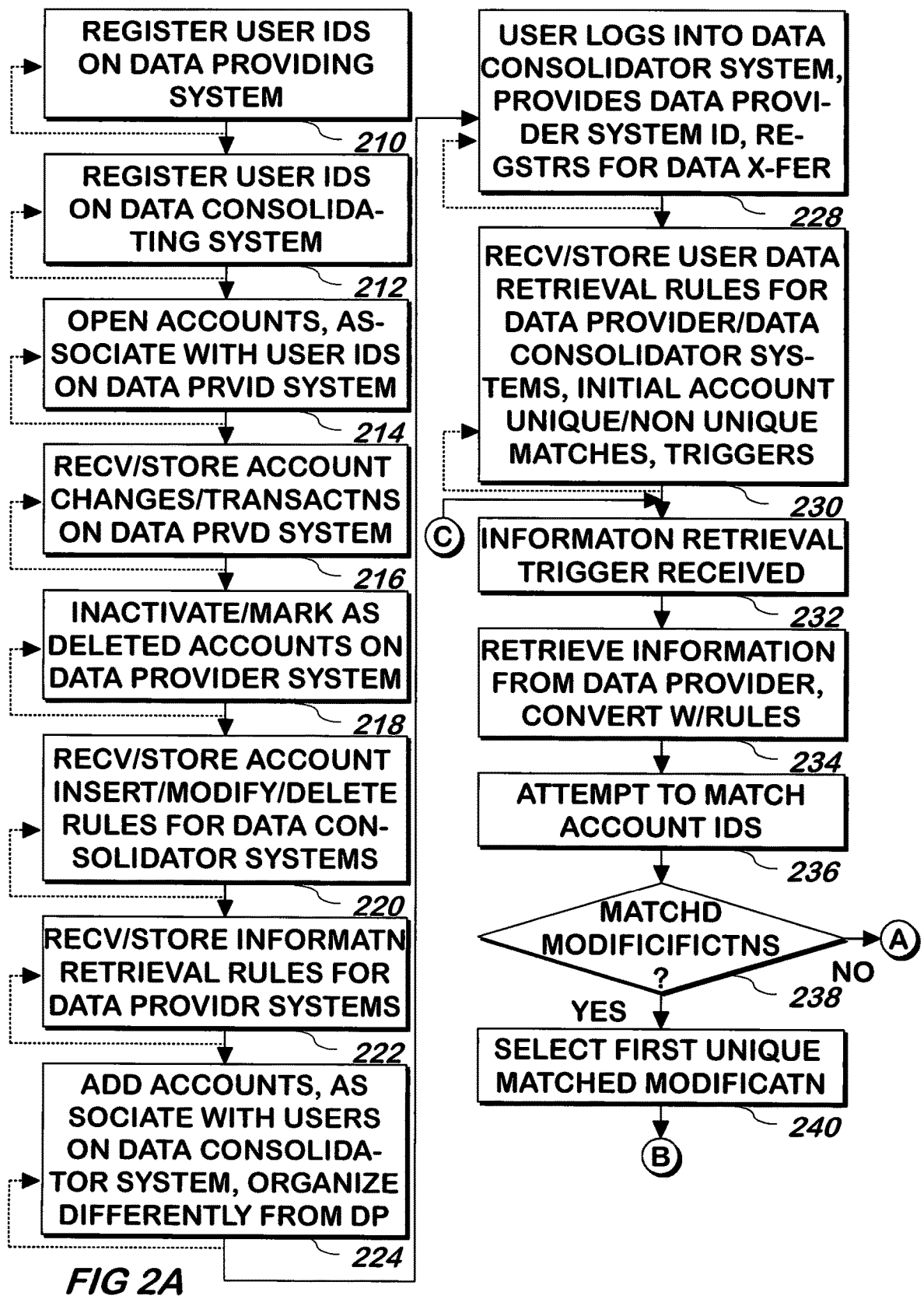
FIG. 2, consisting of FIGS. 2A and 2B, is a flowchart illustrating a method of synchronizing account information across different computer systems coupled via a network according to one embodiment of the present invention.
Figure 2B:
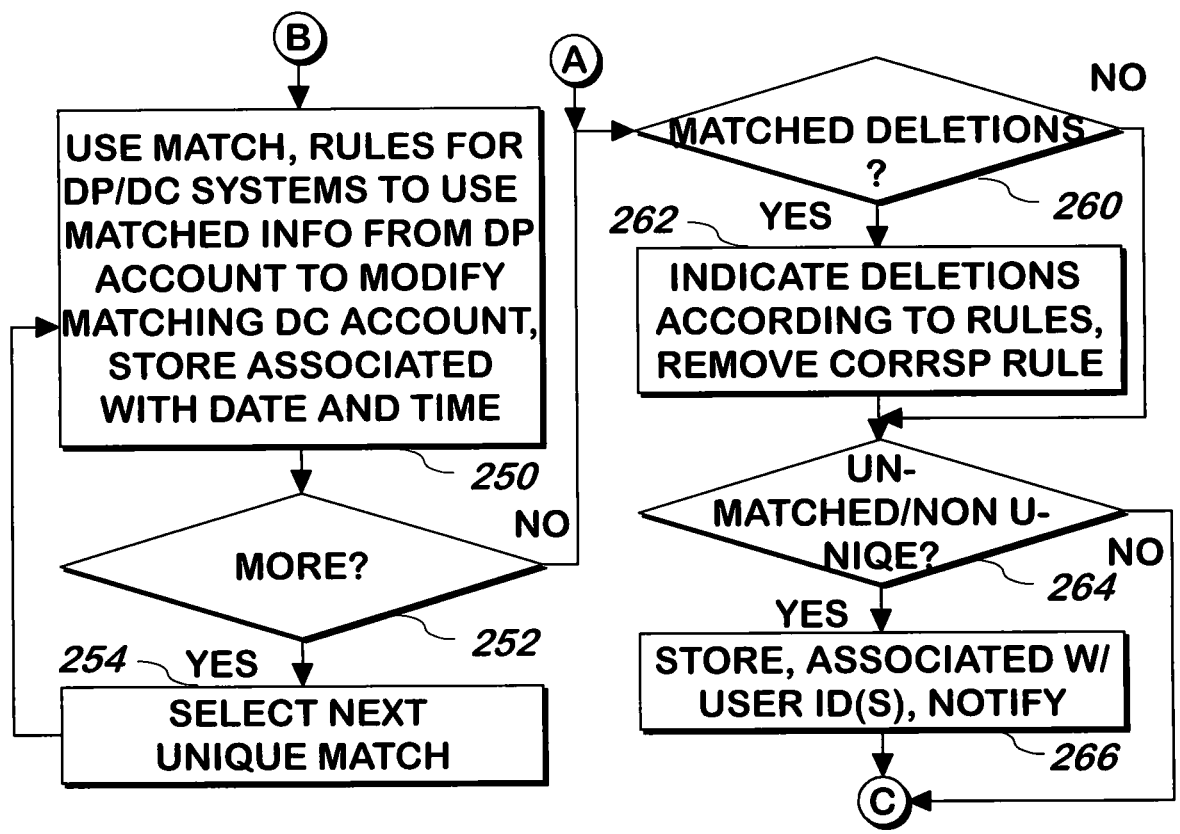

FIG. 2, consisting of FIGS. 2A, 2B, is a flowchart illustrating a method of synchronizing account information across different computer systems coupled via a network according to one embodiment of the present invention. Information or data is collected from one or more data providing systems and consolidated at a data consolidating system using the synchronization method described herein. There may be one or more of each type of system, and each system is connected through a network, typically an Ethernet connection or an internet connection or both.

Register User Identifiers on Data Providing System.

Referring to FIG. 2A of FIG. 2, any number of user identifiers may be registered 210 at any number of data providing systems. A user, such as an individual investor, may be registered at a data providing system by supplying a unique data providing (DP) user identifier (or having the unique DP user identifier assigned), such as a user number or a user name, along with a corresponding DP password along with other information such as first name and last name and Social Security number and/or birthdate. The user may be registered, or have their registration information updated, with one or more different data providing systems, and the user may be registered with any number of data providing systems at any time. The user's DP user identifier and DP password provided or assigned at one data providing or data consolidating system may or may not be identical to the user's DP user identifier and DP password at another data providing system. In one embodiment, the registration of individual users at any data providing system may be an independently operating process, as shown by the dashed lines in the Figure. In one embodiment, at least two types of users may be registered: retail users and investment advisors, and there may be many of each users registered on each data providing system. A retail user may or may not be a client of an investment advisor, and each investment advisor may have one or more retail users as clients.

Register User Identifiers on Data Consolidating System.

Any number of user identifiers may be registered 212 at any number of data consolidating systems. A user, such as a wealth management advisor, may be registered at the data consolidating system by providing a unique data consolidating (DC) user identifier (or having the unique DC user identifier assigned), such as a user number or a user name, along with a corresponding DC password. The user may be registered, or have their registration information updated, with one or more different data consolidating systems, and the user may be registered with any number of data consolidating systems at any time. The user's DC user identifier and DC password provided or assigned at one data consolidating system may or may not be identical to the user's DC user identifier and DC password at another data consolidating system or data providing system. In one embodiment, the registration of individual users at any data consolidating system may be an independently operating process, as shown by the dashed lines in the Figure. In one embodiment, only account advisors register user identifiers at the data consolidating system.

Open Accounts and Associate with User Identifiers on Data Providing System.

One or more data providing accounts, including any wealth management advisor accounts, may be opened by a user on the data providing system, and any such account may be associated or linked with not only the user identifier of the user on whose behalf the account is opened, but may also be associated with the user identifiers of other users, such as account advisors on the same data providing system 214. In one embodiment, an advisor user identifier is linked to accounts of one or more retail users to give the account advisor access to account information corresponding to any number of other users' accounts that are associated or linked to that advisor account at the same data providing system. In one embodiment, the advisor may be only given access to account information, such as any transaction information, corresponding to the linked account(s), and may also be given account privileges to modify the linked account(s) or perform actions with the linked account(s), such as initiating transactions from the linked account(s) or to retrieve information from such linked accounts as described herein.

In one embodiment, a data providing user identifier may be linked to a data providing advisor identifier to allow the advisor access to all accounts of that user, or a link between an individual user account and advisor user identifier may be initiated, each by the owner of the user account, and confirmation and/or permission may be required by one or both or neither parties. Any number of retail user accounts may be linked to an advisor user identifier at any time, there may be any number of advisors registered, and the process of linking accounts to the advisor account may be an independently operating process, as shown by the dashed lines in the Figure.

Receive Account Changes/Transactions On Data Providing System.

Account information corresponding to any number of data providing system accounts linked as described above, including any information regarding changes made to such data providing system or any transaction information corresponding to the linked accounts, may be received and stored 216 at the data providing system.

Inactivate/Mark as Deleted Accounts on Data Provider System.

Any number of accounts may be inactivated or marked as deleted on the data providing system at any time 218.

Receive And Store Account Insert/Modify/Delete Rules for Data Consolidator System.

Synchronization rules for inserting, modifying, and/or deleting any account and/or account information at each data consolidating system are received and stored 220. Synchronization rules received may include a set of rules for the manner in which any account data, such as account data retrieved from any data providing system as described in more detail below may be used to modify or synchronize account information for a corresponding account at the data consolidating system as described in more detail below. Insertion rules may apply to the manner in which new information, such as that retrieved corresponding to a data providing account, may be used to add a new corresponding data consolidating account, and modifying rules may apply to the manner in which information such as changed account information from a data providing system may be used to modify any corresponding data consolidating account information. Deletion rules describe the manner in which an account on the data consolidating system may be marked as deleted, inactive, or the like. In one embodiment, the rules describe the commands used to perform such actions, as well as the format of such commands. In one embodiment, synchronization rules for the data consolidating system may be received from a system administrator of the data consolidating system or of a matching system, described in more detail herein, and synchronization rules for any number of data consolidating systems may be received and stored at the matching system at any time associated with a data consolidating identifier of the data consolidating system for which the modification rules are received. The process of receiving and storing synchronization rules for data consolidating systems may be an independently operating process as shown by the dashed lines in the Figure.

Receive and Store Information Retrieval Rules for Data Provider Systems.

Information retrieval rules for one or more data providing systems are received, such as by a system administrator of the data providing system or matching system, and such information retrieval rules are stored associated with the data providing system identifier corresponding to the data providing system for which the retrieval rules are received 222. In one embodiment, the method of retrieving data from one data providing system may be different than the method of retrieving data from a different data providing system, and these rules identify or harmonize the difference. Additionally, data, or the type of data, or the format of data retrieved from one data providing system may be different from the data, type of data or format of data retrieved from a different data providing system. In one embodiment, retrieval rules for a data providing system may include rules for how to retrieve information from the data providing system, as well as rules for how to convert or format such retrieved information into a common format that may be designed to be easily organized or synchronized as described herein, and any such retrieval rules for the data providing system may be received with a data providing system identifier corresponding to the data providing system for which the retrieval rules are received.

Add Accounts Associated with Users on Data Consolidator System, Organize Differently from Data Provider.

One or more accounts corresponding to those existing or to exist on the data providing system are added to the data consolidating system, associated with one or more users such as one of the several financial advisors registered on the data consolidating system. In one embodiment, accounts corresponding to data providing account(s) managed by the advisor (i.e. accounts which the advisor has been given access to by the owners of such accounts) may be added to the data consolidating system and associated with the advisor on the data consolidating system, such as by a data consolidating user identifier of the advisor. In one embodiment, the data providing accounts are organized differently on the data consolidating system than corresponding accounts on the data providing system 224. For example, two brothers owning two separate accounts on the data providing system which have no explicit connection on the data providing system, may have their two accounts added to the data consolidating system by the advisor and linked on the data consolidating system by the advisor such that the two accounts include an indication that the owners of the accounts are brothers.

User Logs into Data Consolidator System, Provides Data Provider System Identifier and Registers For Data Transfer.

The user, such as the investment advisor, may log in to the data consolidating system and register for event driven data transfer from one or more data providing systems 228 by requesting such data transfer and identifying the events. The registration for data transfer may include the data providing system identifier corresponding to the data providing system from which the data transfer is requested. In one embodiment, as part of step 228, the user logs in to his or her data consolidating account at the data consolidating system using the data consolidating username and password previously established with such data consolidating system as part of step 212 above.

The data providing system identifier and registration for data transfer may be processed as follows. First, the investment advisor sets up data transfer with the matching system such as is described in the related application. A set of default events are assigned to the user at the matching system when data transfer is registered, and the matching system instructs the data consolidating system to notify the investment advisor of one or more of the default events such as a log on to the data consolidating system. A link is provided to the matching system that allows changes to be made. If the investment advisor clicks the link, the data consolidating system causes the advisor's browser to request a web page from the matching system, and identify the advisor, such as by using an opaque user identifier described in the related application via a relay described below. The investment advisor may then change the default events as described in more detail below.

The investment advisor may arrange data retrieval to any number of data consolidating systems from any number of data providing systems at any time, as indicated by the dashed lines in the Figure.

Receive and Store User Data Retrieval Rules for Data Provider/Data Consolidator Systems, Initial Account Unique/Non Unique Matches, and Triggers.

Data retrieval rules for the data providing system and data consolidating system are received from the investment advisor (who is the user of the data consolidating system) along with any initial match rules, such as any initial unique match rules and/or initial non-unique match rules for accounts, and any trigger changes from the default, and all such rules received are stored 230. Such rules and triggers may be received for each combination of data providing system and data consolidating system for which data retrieval was set up as described in step 228. In one embodiment, investment advisor data retrieval rules received from the investment advisor may be rules specific to the advisor and/or the advisor's account(s), and may include rules that determine how information retrieved from the data providing system will affect the data consolidating system for that investment advisor's accounts at the data consolidating system. Data retrieval rules received from the advisor may be a more specific set of the more general set of rules for retrieving data received as part of step 212, or they may supersede the more general rules for retrieving data. For example, data retrieval rules received from the user may identify data that is to be discard after retrieval so that it is not added to the data consolidating system for which it was retrieved.

An initial unique match rule may map data providing account information corresponding to a specific data providing system account to a corresponding data consolidating account in a manner that will, or has the potential to, map one account of the investment advisor on a specified data providing system to no more than one account of the investment advisor on a specified data consolidating system. In one embodiment, uniquely matched data retrieved from the data providing system may be mapped automatically to its corresponding account on the data consolidating system as described in more detail below. For example, an initial unique match rule may indicate that any data providing account information retrieved corresponding to data providing account DP1111 directly corresponds to data consolidating account DC2222, and any account information retrieved for DP1111 may be mapped to data consolidating account DC2222 to synchronize the two accounts as described in more detail below.

A non-unique match rule has the potential to correspond to more than one data consolidating account or data providing account of the advisor who supplies it. For example, an investment advisor may specify that information from a data providing system that includes certain information, such as user birth date information or last name information or user Social Security number information (e.g. a user owning more than one account may have his or her Social Security number associated with more than one user account) could be matched to one or more accounts, but the match might not be unique. In one embodiment, any account information retrieved from a data providing system that is matched to a data consolidating account using non-unique information may require additional confirmation from the advisor before it is mapped to its corresponding data consolidating account as described in more detail below.

In one embodiment, match rules including unique match rules and non-unique match rules may be received by the investment advisor demonstrating, at least in part, using samples of previously retrieved data corresponding to one or more data providing accounts that may or may not be associated with one or more of the user's accounts on the data consolidating system. For example, sample data from one or more accounts on the data providing system previously retrieved but with numbers replaced with randomly assigned numbers may be shown to the investment advisor with columns headings, and the investment advisor can indicate a column heading and provide actual data values for that column heading along with the column name and data values to match on the data consolidating system. Sample data from the data consolidating system and column headings may also be displayed to the user in a similar manner as described above to allow the user to demonstrate the column heading by selecting it.

Data retrieval trigger information received from the advisor may include one or more specifications for when to retrieve or extract data from the data providing system. For example, the user may request the extraction of data from the data providing system at a certain time every weekday, and/or request data extraction every time that the user logs in to the data consolidating system, and/or every half hour that the user remains logged in to the data consolidating system, and/or every day at 6:00 AM, and/or any other triggers for when to retrieve data. The process of receiving and storing user data retrieval rules, match rules and trigger rules may be an independently operating process as shown by the dashed lines in the Figure.

Information Retrieval Trigger Received.

At step 232, an information retrieval trigger is received. For example, if data is set to be retrieved at 6 AM on every weekday, then the information retrieval trigger may be received at 6 AM on a Monday morning (as well as Tuesday, Wednesday, etc.).

Retrieve Information from Data Provider, Convert with Rules.

Account data may be retrieved from the data providing system or systems corresponding to the received trigger and any retrieved account data may optionally be converted into a common format into which data retrieved from any system is converted 234. In one embodiment, data may be retrieved and converted using the information retrieval rules stored as part of step 222 for the data providing system from which such data is retrieved, and the investment advisor supplied data retrieval rules for the data providing and data consolidating systems received and stored as described with respect to step 230. Account data retrieved from the data providing system may be data that has changed since the last time account data for that data providing account was retrieved, and account data may include any account transaction information, or new account information, or closed or deleted account information, or any other information as described in the related application. In one embodiment, the date and time of each retrieval is stored by the matching system, and the prior time of retrieval for an investment advisor from a data providing system is specified at the next retrieval from a data providing system due to an investment advisor's trigger.

Attempt to Match Account Identifiers.

An attempt is made 236 to match account data retrieved from the data providing system with the corresponding data consolidating account(s) that will be synchronized on the data consolidating system by retrieving the rules received from the investment advisor corresponding to the trigger, and the data providing system from which the data was retrieved and the data consolidating system corresponding to the trigger, and using it to match the data retrieved, using both the unique match information and the non-unique match information and marking the matched data with the type of match (unique or non-unique), as well as whether the match is a matched modification or a matched deletion.

If No Uniquely Matched Modifications are Identified.

If no uniquely matched modifications are identified 238, then the method continues at step 260.

If any Unique Matched Modifications are Identified, Select First Uniquely Matched Account Modification.

If any unique matches are identified for any retrieved data providing account information 238, then the first uniquely matched account modification, including the data providing account identifier corresponding to the unique match, the data consolidating account identifier corresponding to the unique match, and the data providing account data retrieved from the data providing system associated with the unique match, is selected 240.

Use Match and Rules for Data Provider/Data Consolidator Systems to Use Matched Information From Data Provider Account To Modify Matching Data Consolidator Account, and Store Data Consolidator Account Identifier with Date and Time.

The rules for the data consolidating system (received as part of step 220) and user retrieval rules received from the user (as part of step 230) that describe what data to insert into the accounts on the data consolidating system and how to insert it are applied to the selected unique match to synchronize data by adding it to on the data consolidating system 250, and the method continues at step 252. In one embodiment, the data consolidating account identified with the selected unique match is modified or synchronized on the data consolidating system using the data providing account data retrieved with the selected unique match. Additionally as part of step 250, the data consolidating account identifier of synchronized data consolidating account may be stored by the data consolidating system and/or the matching system associated with the date and time the account was synchronized 250.

If More Unique Matches, Select Next Unique Match.

If any additional unique matched modifications identified for the retrieved data providing account information exist that have not yet been processed 252, then the next unique match may be selected 254 and the method continues at step 250 using the newly selected unique match.

If No More Unique Matches, and if Matched Deletions, then Indicate Deletions According To Rules, Remove Corresponding Rule.

If no more uniquely matched account modifications exist that have yet to be processed 252, and if any matched deletions were identified 260, then the matched deletions are synchronized according to the deletion rules received in step 220 for the data consolidating system corresponding to the trigger, and any matching rules received from the user in step 230 or step 332 described above only corresponding to the deleted account are removed 262. In one embodiment, a matched deletion may be an indication retrieved from a data providing system that an account at the data providing system linked to an account at the data consolidating system has been deleted or marked as deleted or otherwise inactivated at the data providing system. Any account or account information deletions on the data providing system matched on the data providing system may be deleted from the data consolidating system, or marked as inactivated on the data consolidating system, or otherwise processed at the data consolidating system as defined by the applicable synchronization rules for deleting account or account information on the data consolidating system corresponding to the trigger.

If Un-Matched Modification or Non Unique Match, Store Associated with User Identifier(s) and Notify.

If any data providing account information retrieved remains not uniquely matched after the matching process described herein 264, such account information may be stored associated with the user identifier or identifiers of the data providing account from which the data is retrieved, and the data consolidating account for which they are retrieved, and notification may be sent to the user (i.e. the investment advisor) of the data consolidating system for which there is unmatched and/or non-uniquely matched account information 266, and the method continues at step 232. For example, there may be unmatched account information from a data providing system if a user account is linked to an investment advisor account at the data providing system, but the investment advisor has not yet provided any synchronization rules corresponding to the linked accounts on the data consolidating system or the synchronization rules are insufficient to generate a unique match.

If No Unique Matches, No Un-Matched Modifications and No Non Unique Matches.

If no unmatched or non-uniquely matched account information is identified 264, then the method continues at step 232.

User Logs in to Data Consolidator System, Receives Notification.

Figure 3:
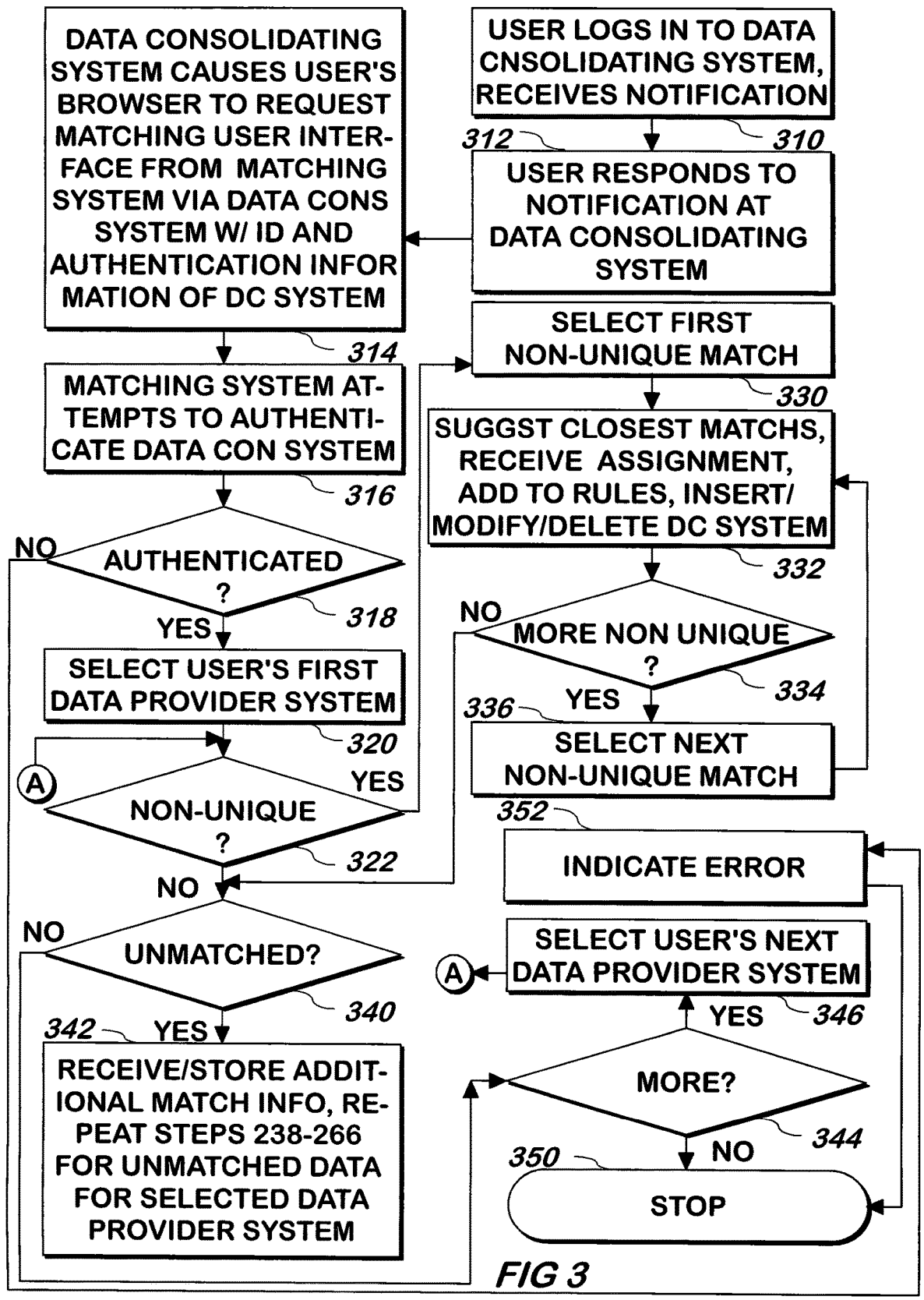
FIG. 3 is a flowchart illustrating a method of assigning unmatched and/or non-uniquely matched account information from one or more data providing systems to one or more accounts on a data consolidating system according to one embodiment of the present invention.

Referring now to FIG. 3, a user may log in to a data consolidating system, and any notifications, such as a notification corresponding to unmatched or non-uniquely matched account information retrieved from one or more data providing systems as provided as a part of step 266 of FIG. 2B, may be provided by, and received by the user at, the data consolidating system 310. In one embodiment, the user may log in to the data consolidating system using the DC username and password previously established and stored for the user as part of step 212. Notification may be received in any conventional manner by the user at the data consolidating system.

User Responds to Notification at Data Consolidating System.

A response to the notification may be received from the user at the data consolidating system 312. In one embodiment, the user notification response may be received at the data consolidating system, such a response indicating that the user wishes to view and/or assign the unmatched or non-uniquely matched account modification information to one or more data consolidating accounts. The notification response may be received from the user as a click on a link provided with the notification to the user by the matching system via the data consolidating system.

Data Consolidating System Causes User's Browser to Request Matching User Interface from Matching System Via Data Consolidating System with Identifier and Authentication Information of Data Consolidator System.

When the notification response is received from the user at the data consolidating system, in one embodiment, the data consolidating system may cause the user's browser to request a user interface from the matching system by the data consolidating system building a web page that makes such request to the matching system via the data consolidating system 314. In one embodiment, the web page built by the data consolidating system may cause the user's browser to request a new web page from the data consolidating system using any conventional script techniques. The web page built by the data consolidating system may also include the user identifier of the investment advisor responding to the notification at the data consolidating system and the capability to send to the matching system such identifier, which in one embodiment is an opaque user identifier as described in the related application. For example, the data consolidating system may build the web page such that the user's (opaque) identifier is imbedded into a script on the web page that causes the user's browser to request the new web page from the data consolidating system with the imbedded (opaque) user identifier. The user's browser may receive the web page from the data consolidating system and may request the new web page from the data consolidating system, such as by running the script included in the web page received from the data consolidating system, and the browser's request to the data consolidating system may include the user identifier (or opaque user identifier) that was imbedded into the script. In other embodiments, the user identifier or opaque user identifier may be provided by the data consolidating system to the user's browser, and/or vice versa, using conventional cookies, or redirect commands may be used to cause the user's browser to request the web page, or any other method or combination of methods may be used.

In one embodiment, the request from the user's browser may be received at the data consolidating system, along with the user's (opaque) identifier, and the request may be provided to the matching system. The request may be provided to the matching system may include the opaque user identifier (or any other user identifier) of the user responding to the notification, and may also include the data consolidating system identifier and authentication information corresponding to the data consolidating system. Other methods of requesting a user interface from the matching system directly may be employed.

Matching System Attempts to Authenticate Data Consolidating System.

A connection may be established between the matching system and the data consolidating system if one does not exist, and in such a case, an attempt may be made by the matching system to authenticate the data consolidating system and vice versa 316. In one embodiment, the data consolidating system may be authenticated to the matching system, or the data consolidating system and the matching system may be authenticated to each other, using conventional authentication techniques such as https techniques. If an authenticated connection exists between the matching system and the data consolidating system, such connection may be used, and no new connection need be established.

If not Authenticated, Indicate Error.

If the data consolidating system is not authenticated by the matching system or vice versa, or the user is not authenticated to the data consolidating system 318, an error may be indicated 352 and the method terminates 350.

If Authenticated, Select Users' First Data Provider System.

If the data consolidating system is authenticated by the matching system and vice versa and the user is authenticated by the data consolidating system 318, a relay is set up by the data consolidating system to relay information between the matching system and the user computer system and vice versa. At the matching system, the user's first data providing system is selected 320, and additional match rules or match information may be received from the user as described below.

If Account Information is Non-Uniquely Matched, then the First Non-Unique Match is Selected.

If account information retrieved from the selected data providing system as described with respect to FIG. 2 and stored as part of step 266 above non-uniquely matches account information on the data consolidating system 322, then the first non-unique match for the selected data providing system is selected 330. The account or accounts at the data consolidating system identified as non-uniquely matched to the data providing account information may be displayed or otherwise suggested to the user as the closest or most likely match or matches for the non-uniquely matched data providing account information, and an account assignment for the non-uniquely matched data providing account information may be received from the investment advisor 332. It is noted that a match may not be unique because it has the potential to non-uniquely match, even though the actual match may be unique. Thus, if data providing system account information with only a birthday supplied matches only one account in the data consolidating system, it may still be considered a non-unique match. Assignment information received from the user may be used to synchronize the data consolidating account corresponding to the assignment information using the data providing account information in the same manner described above, and any number of match rules may be added to the existing user retrieval rules, such as a rule that uniquely matches the account number corresponding to the retrieved data providing account information to the data consolidating account to which the account information is assigned by the investment advisor 332. In one embodiment, timestamp information indicating the date and time that the account assignment information is received from the investment advisor may be recorded associated with the DC account identifier corresponding to the data consolidating account to which the account assignment is assigned.

If More Non-Unique Matches, Select Next Non-Unique Match.

If any additional non-uniquely matched account information is retrieved that is not assigned 334, then the next unassigned non-unique match for the selected data providing system is selected, and the method continues at step 332.

If No More Non-Unique Matches, and if any Unmatched Account Information, then Receive and Store Additional Match Information, Repeat Steps 238-266 for Unmatched Data for Selected Data Provider System.

If no additional non-unique matches exist for which to receive a data consolidating account assignment 334, then a check may be performed to determine if there exists any unmatched information for which to receive assignment. If such unmatched account information is identified 340, then such information may be displayed to the user, additional match information may be received and stored for such non-uniquely matched account information, and steps 238-266 of FIGS. 2A and 2B may be repeated for any such unmatched data corresponding to the selected data providing system by applying the match information received to the unmatched and/or non-uniquely matched information 342. The method continues at step 344.

If No Unmatched Account Information:

If More Data Provider Systems, Select User's Next Data Provider System.

If no unassigned data providing account information is identified that is unmatched 340, then the method continues at step 344. At step 344, if there are additional data providing systems from which data providing account information retrieved for the user at the data consolidating system is unassigned (unmatched or non-uniquely matched) to any of the user's data consolidating accounts 344, then the next data providing system is selected 346, and the method continues at step 322 using the newly selected data providing system.

If No More Data Provider Systems, Stop.

If there are no additional data providing systems from which retrieved data corresponding to the user logged in to the data consolidating system is unassigned or unprocessed 344, then the method may stop 350. The method of FIG. 3 may be repeated each time an investment advisor responds to a notification as described above, and may be performed any number of times for any number of investment advisors.

Select First User.

FIG. 4, consisting of FIGS. 4A and 4B, is a flowchart illustrating a method for synchronizing potential account deletions between one or more data providing systems and one or more data consolidating systems according to one embodiment of the present invention. Referring now to FIG. 4, a first user is selected 410. The first user may be selected as a user of any data consolidating system for which data transfer was requested as described in step 228 of FIG. 2. In one embodiment, one data consolidating system may be used with the matching system, or multiple data consolidating systems may be used. If multiple data consolidating systems are used with the matching system, then the first user selected may be the first user at a first data consolidating system selected at random. If a user has accounts at two different data consolidating systems, the user is treated as two users.

At Matching System, Identify all Data Consolidating Accounts of User.

At the matching system, all of the selected user's data consolidating accounts two which unique or non-unique matches may be made are identified 412, using the matching information supplied by the user as described above in steps 230, 332 and 342.

Select First Identified Data Consolidator System Account.

Of the data consolidating accounts identified for the selected user at the matching system, the selected user's first data consolidating account is selected 414.

Compare Last Activity to Threshold.

The last activity stored in association with the selected user's selected data consolidating account is identified, and the date and time of the last activity identified may be compared to a last activity threshold 416. In one embodiment, any matching activity described above corresponding to any data consolidating account may be recorded for the account, as described herein, each record including the DC account identifier and a timestamp, and the last activity for the selected data consolidating account may be identified from such records. The date and time of the last activity may be compared to the last activity threshold date and time, which may be a date and time approximately one year prior to the current date and time, or six months prior to the current date and time, or any other date and time.

If Older than Threshold, Store Indication that Deletion May be Needed.

If the date and time of the last matching activity corresponding to the selected user's selected data consolidating account is older than the last activity threshold date and time 418, then an indication that a deletion may be needed is stored in association with the data consolidating user identifier of the selected user, the data consolidating account identifier of the selected user account, and the date and time of the last activity identified 420. In one embodiment, such an indication may be stored on the matching system. It is noted that, as described in the related application, the matching system may be a part of a data consolidating system or a data providing system.

If not Older than Threshold, or if More Data Consolidator Accounts Owned by User, Select Next Identified Data Consolidator Account.

If the timestamp of the last activity identified for the selected user's selected data consolidating account is not older than the last activity threshold date and time 418, and there are additional data consolidating accounts associated with the selected user by the selected data consolidating system user 422 (because matching information for such account or accounts was specified by the selected user), then the next data consolidating account identified for the user is selected 440, and the method continues at step 416 using the newly selected data consolidating system account.

If No Additional Data Consolidator Accounts for User, and, and if any Indications Stored for User, then Instruct Data Consolidator System to Notify User.

If no additional data consolidating accounts are identified for the selected user 422, if any one or more indications that deletion may be needed is stored for the selected user 430, then the data consolidating system or systems corresponding to any such stored indication may be instructed to notify the user of the potential deletion 432 and the method continues at step 434.

If More Users, then Select Next User.

If no indication that deletion may be needed is stored for the selected user 430, and if additional data consolidating system users for which deletions may be needed exist to be checked 434, then the next user at any data consolidating system registered to the matching system as described in step 228 of FIG. 2 is selected 436, and the method continues at step 412.

If No Indications Stored for User, and No More Users, Wait.

If no additional users at the data consolidating system exist for which any account deletion(s) may be needed 434, then the method may wait as part of step 438. In one embodiment, the method may wait for a period of time, such as one month or two weeks or any other period of time, and the check to determine whether deletions are needed may be performed periodically. After this period, the method continues at step 410.

Receive User Log In, Authenticate And Notify.

Referring now to FIG. 4B, user log in information may be received from a user and authenticated at a data consolidating system, and the authenticated user may be notified via the data consolidating system of any indications stored for the user that deletions may be needed 442. In one embodiment, the log in information received from the user, such as the user's data consolidating username and corresponding password, may be authenticated at the data consolidating system in any conventional manner.

Receive User Response to Notification.

A response to the notification provided to the user may be received 444 from the user, such as via a click on a response link provided to the user with the notification.

Pop New Window with User Identifier that Requests User Identifier from Matching System.

When the notification response is received from the user at the data consolidating system, the data consolidating system may request a matching system user interface from the matching system via the data consolidating system, such as by building a new browser window including the data consolidating user identifier (or opaque user identifier) of the user that is logged in and providing the browser window to the matching system as described above.

Set Up Relay from User to Matching System Via Data Consolidating System, Matching System Authenticates, and Matching System Receives User Identifier.

A relay of information may be set up between the user logged in and the matching system via the data consolidating system, as described above, including authenticating the matching system and data consolidating system to each other if required, as described above, and the matching system may receive the user's data consolidating user identifier (or the user's data consolidating opaque identifier as described in the related application) as described above 450.

Matching System Displays Information from Accounts Identified for Possible Deletion.

The matching system may display 452 account deletion information corresponding to the user account(s) identified as accounts for possible deletion and stored as such in association with the user identifier received from the data consolidating system as described above. For example, the matching system may display the account identifier, matching information corresponding to the account identifier, last activity date for that account, and a checkbox for the investment advisor (i.e. the user) to indicate the account should be deleted. In one embodiment, the matching system user interface may display any such information to the user via the data consolidating system, such as via the new browser window initiated by the data consolidating system and provided to the matching system.

Receive User Selection(s) For Deletion.

The user's selection or selections of accounts that should be deleted may be received 454 by the matching system. In one embodiment, the user's selection(s) for deletion, or indication(s) of which of the user's displayed accounts to delete or not delete, may be received by the matching system via the data consolidating system and/or the matching system user interface.

Matching System Instructs Data Consolidator System to Delete Accounts and Remove Rules For Deleted Accounts.

The data consolidating system may be instructed by the matching system to delete the accounts selected for deletion by the user, and any rules associated with the account selected for deletion may be removed from the data consolidating system and the matching system 456. For example, if data consolidating account DC2222 has been deleted on the data consolidating system, then any rules mapping account information corresponding to data consolidating account DC2222 may be removed from the set of unique or non-unique user mapping rules.

System.

Figure 5:
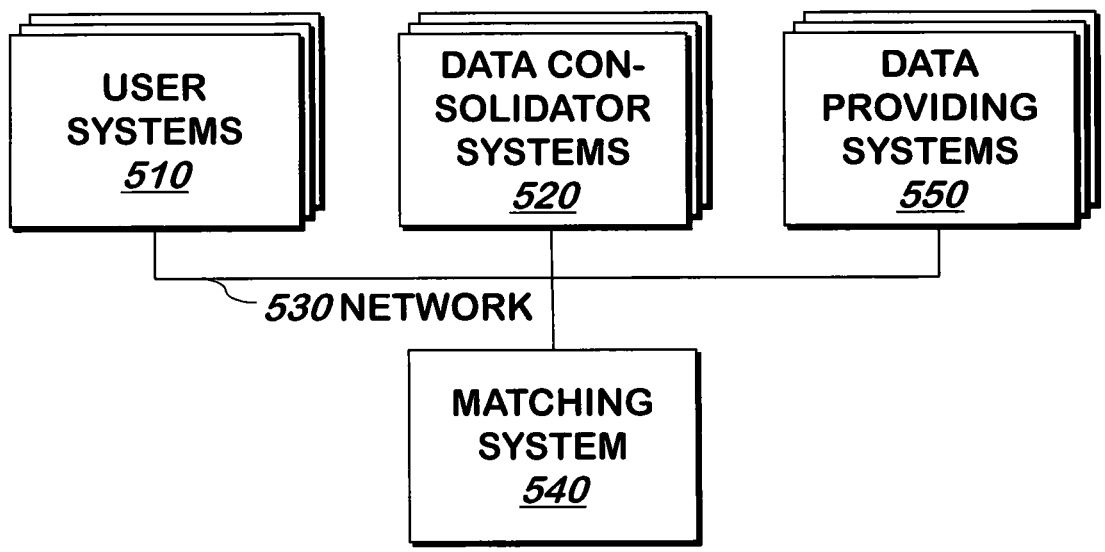
FIG. 5 is a block schematic diagram of a system for synchronizing account information across different computer systems coupled via a network according to one embodiment of the present invention.

FIG. 5 is a block schematic diagram of a system for synchronizing account information across different computer systems coupled via a network according to one embodiment of the present invention.

Figure 6:
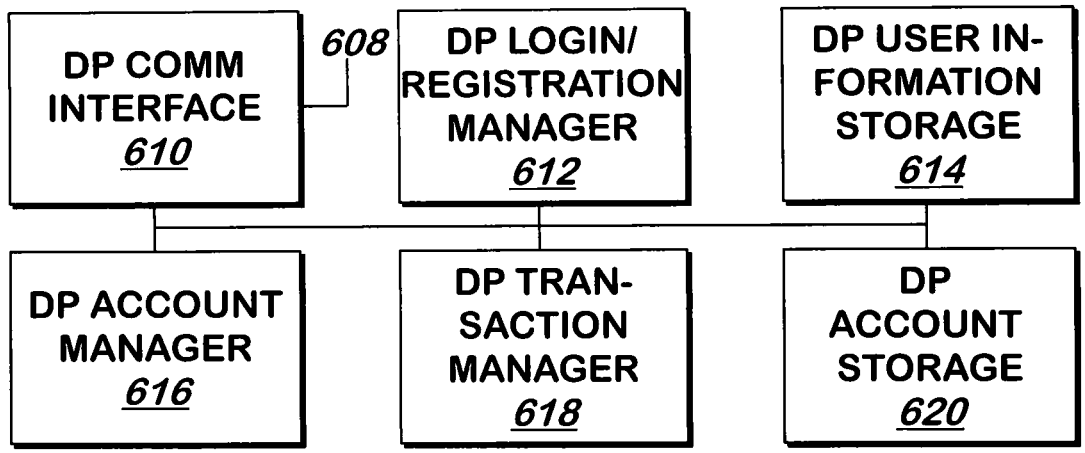
FIG. 6 is a block schematic diagram of data providing system 550 of FIG. 5 shown in more detail according to one embodiment of the present invention.

FIG. 6 is a block schematic diagram of data providing system 550 of FIG. 5 shown in more detail according to one embodiment of the present invention.

Figure 7:
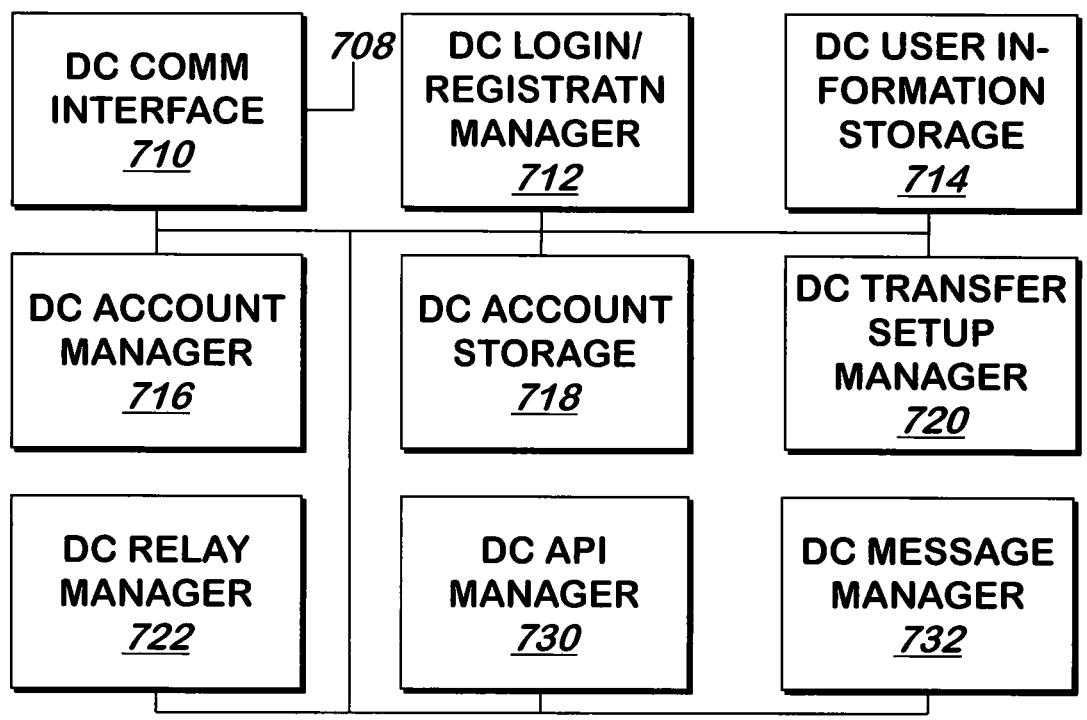
FIG. 7 is a block schematic diagram of data consolidating system 520 of FIG. 5 shown in more detail according to one embodiment of the present invention.

FIG. 7 is a block schematic diagram of data consolidating system 520 of FIG. 5 shown in more detail according to one embodiment of the present invention.

Figure 8:
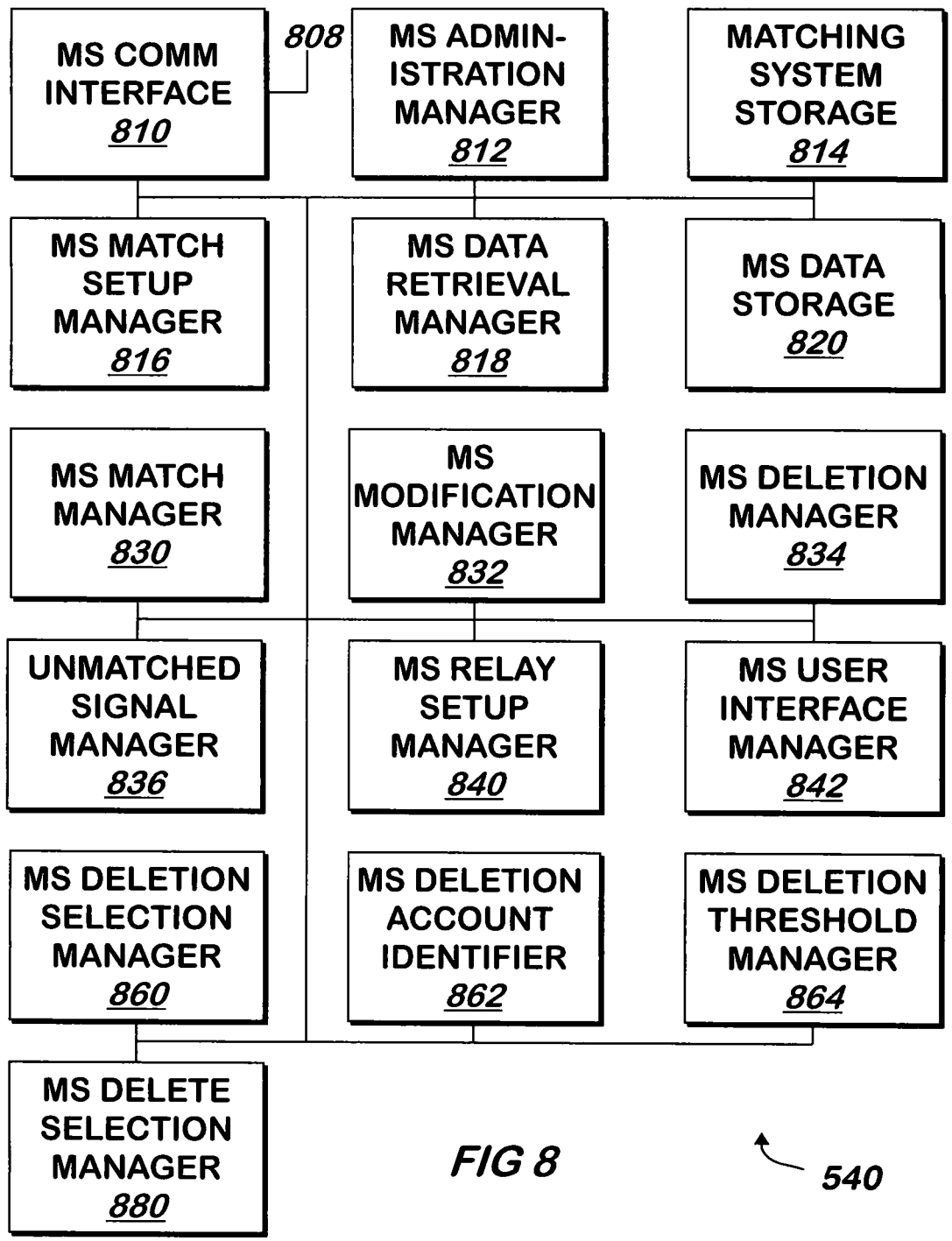
FIG. 8 is a block schematic diagram of matching system 540 of FIG. 5 shown in more detail according to one embodiment of the present invention.

FIG. 8 is a block schematic diagram of matching system 540 of FIG. 5 shown in more detail according to one embodiment of the present invention.

In one embodiment, the system of FIG. 5 contains any number of user systems 510, any number of data consolidating systems 520, a matching system 540 and any number of data providing systems 550, though other arrangements may be used. User systems 510, data consolidating systems 520 and data providing systems 550 operate as described herein, and communicate with matching system 540 via network 530, which may include a conventional Ethernet network, the Internet or both.

Each system 510, 520, 520 and 550 includes a respective communication interface (not shown on system 510), 710, 810, 610, each of which may include a conventional communication interface running suitable communication protocols, such as Ethernet, TCP/IP or both. In one embodiment, unless otherwise noted herein, all communication with each of the systems 510, 520, 540, 550, are made via its respective input/output (not shown on system 510), 708, 808, 608 of its respective communication interface (not shown on system 510), 710, 810, 610.

A user, such as an investor or a financial advisor, may register a user identifier with data providing system 550 using a separate user system 510 that may include a conventional personal computer system with a conventional browser coupled to the Internet using suitable communications techniques. Investors and financial advisors communicate via their respective user systems 510. When the user requests a web page from data providing log in/registration manager 612, data providing log in/registration manager 612 may build a web page containing suitable user interface elements that allow the user to provide registration information and returns it to the user's browser on the user system 510 in response. The user fills out the web page with the registration information, such as a data providing system (DP) user identifier or other identifier and corresponding data providing password, as described above, and provides the information to data providing log in/registration manager 612, which may validate the information (for example, checking for a user identifier that is already registered, etc.) and if the validation is successful, stores such information into data providing user information storage 614 associated with a data providing system (DP) user identifier. Any number of user identifiers may be registered at any number of data providing systems 550 at any time.

The user may also register a user identifier with data consolidating system 520 using the separate user system 510 described above. When the user requests a web page from data consolidating log in/registration manager 712, data providing log in/registration manager 712 builds the web page, including suitable user interface elements to allow the user to provide registration information and return it to the user's browser in response. The user fills out the web page with the registration information, such as a data consolidating (DC) user identifier and corresponding password, as described above, and provides the registration information to data consolidating log in/registration manager 712, which may validate the information (for example, checking for a user identifier that is already registered, etc.) and if the validation is successful, may store the registration information into data consolidating user information storage 714 associated with a data consolidating (DC) user identifier. Any number of user identifiers may be registered at any number of data consolidating systems 520 at any time.

The user may log in to data providing system 550 using conventional log in techniques via a web page provided by data providing log in/registration manager 612 using the previously established DP user identifier and password described above, and when logged in, the user may request to open any number of data providing system (DP) accounts on the data providing system 550. In one embodiment, the user may request to open the account on the data providing system 550 via a web page link provided by data providing log in registration manager 612 after a successful log in that requests a web page from data providing account manager 616, and data providing account manager 616 may receive the request, open the requested DP account, and store the DP account in data providing account storage 618 associated with a data providing system (DP) account identifier and the DP user identifier of the user from which the request was received.

Additionally, the user may request to link the DP account with not only the user's own DP user identifier on the data providing system 550, but also with the DP user identifier of another user on the same data providing system 550, such as a financial advisor, as described above. In one embodiment, the user may provide any other DP user identifier registered on the data providing system 550, such as the DP user identifier corresponding to any other DP user, such as that of the user's financial advisor, that is to be granted access to the DP account, as described above. Data providing account manager 616 receives any such additional DP user identifier(s) and stores the received DP user identifier(s) associated with the DP account identifier in data providing account information storage 618, as described above. The user may request to link any number of DP user identifiers to the data providing account opened by the user at any time, and/or any number of DP accounts opened by the user may be linked by the user to any DP user identifier, as described above, though typically, one data providing account opened by the user is automatically linked to his/her own DP user identifier and manually linked by the user to the DP user identifier of his/her financial advisor, as described above. In one embodiment, a DP user identifier corresponding to an individual investor at data providing system 520 may be linked to any number of DP accounts opened by the individual investor, and the DP user identifier corresponding to a financial advisor at data providing system 520 may be linked to any number of DP accounts opened by the financial advisor as well as any number of DP accounts opened by other individual investors. The process of linking DP user identifiers to DP accounts may be performed at any time, as described above.

The user may initiate any account changes and/or transactions at the data providing system 550 using any DP account with which the user's DP user identifier is linked in data providing account storage 618 via one or more links provided on one or more web pages by data providing log in/registration manager 612 that generate a request to data providing transaction manager 616. In response, data providing transaction manager 616 may provide a web page containing user interface elements to receive from the user any account changes and/or transaction information corresponding to a DP account, and data providing transaction manager 616 may receive such information and store a record of each of such account changes and/or transactions in data providing account storage 618 associated with the DP account identifier corresponding to the DP account, the DP user identifier of the logged in user from which such account changes and/or transactions were initiated, and the date and time of when such account changes and/or transaction information was received.

The user may also request via one or more links provided on one or more web pages by data providing log in/registration manager 612 that ultimately specify data providing transaction manager 616 to inactivate or delete any data providing system account to which the user's DP user identifier is linked in data providing account storage 618. Data providing transaction manager 616 may provide a web page containing suitable user interface elements to receive from the user any account deletion information corresponding to a DP account linked to the user's DP user identifier, and data providing transaction manager 616 may store a record of each of such account deleted in data providing account storage 618, such as by marking the DP account as deleted and storing the date and time of the account deletion with the DP user identifier of the logged in user from which the account deletion was initiated.

At any time, matching system administration manager 812 may receive synchronization rules, including insertion rules, modification rules and/or deletion rules as described above, that correspond to a data consolidating system 520, such as from a system administrator for the matching system 540. Synchronization rules may include rules for the manner in which any account data, such as data providing system (DP) account data retrieved from any data providing system 550, may be used to insert, modify or delete account information for a corresponding account at the data consolidating system, as described above. Insertion rules may apply to the manner in which new DP account information may be used to add a new corresponding data consolidating account, and modifying rules may apply to the manner in which information such as changed DP account information, for example, from a data providing system 550, may be used to modify any corresponding data consolidating system account information. Deletion rules describe the manner in which an account on the data consolidating system may be marked as deleted, inactive, or the like. In one embodiment, the synchronization rules describe the commands used to perform such actions, as well as the format of such commands, including information required to be supplied as part of the commands. Matching system administration manager 812 may receive the synchronization rules with the DC system identifier corresponding to the data consolidating system 520 for which such synchronization rules apply, and matching system administration manager 812 may store the received synchronization rules in matching system storage 814 associated with the received DC system identifier. Any number of synchronization rules corresponding to any number of data consolidating systems 520 may be received at any time.

Matching system administration manager 812 may also receive information retrieval rules corresponding to any number of data provider systems 550. In one embodiment, matching system administration manager 812 may receive the information retrieval rules from a system administrator at the matching system 540, or a system administrator at the data provider system 550 for which the retrieval rules are received, and matching system administration manager 812 may receive the information retrieval rules with the DP system identifier corresponding to data providing system for which the retrieval rules apply, as described above. Information retrieval rules for a data provider system 550 may include rules for retrieving data, such as DP account information or transaction information corresponding to a DP account at data providing system 550, as well as rules for converting any such retrieved information into an alternate format, such as a common format to allow the retrieved DP account information to be easily converted to synchronize one or more DC accounts at a data consolidating system 520, as described above. Matching system administration manager 812 may receive retrieval rules corresponding to any number of data providing systems 550, and matching system administration manager 812 may store any received retrieval rules in matching system storage 814 associated with the DP system identifier corresponding to the data providing system 550 for which the retrieval rules apply.

A user, such as the financial advisor, may log into data consolidating system 520 using conventional log in techniques, such as by providing the user's previously registered DC user identifier and corresponding password. In one embodiment, data consolidator log in/registration manager 712 provides the user interface for the user to log in to data consolidating system 520 and receives the user's log in information, and data consolidating log in/registration manager 712 may store a log in serial number on the user's user system 510 as an encrypted cookie and store the log in serial number associated with the user's DC user identifier in data consolidating user information storage 714 along with the date and time of log in. As described herein, the user's DC user identifier may be passed from element to element of data consolidating system 520 using the log in serial number and/or conventional encrypted cookie techniques.

When logged in to data consolidating system 520, the user may request to add any number of data consolidating accounts, such as by clicking an add accounts link ultimately specifying data consolidating account manager 712, such as an add account link provided on a web page provided by data consolidator log in/registration manager 712. In one embodiment, the user clicks the add accounts link specifying data consolidating account manager 716, and data consolidating account manager 716 receives the click and identifies the user's DC user identifier, such as by reading the encrypted cookie stored on the user's user system 510 by data consolidating log in/registration manager 712. In one embodiment, data consolidating account manager 716 decrypts the encrypted cookie and identifies the DC user identifier associated using the decrypted log in serial number in data consolidating user information storage 714.

Data consolidating account manager 716 provides suitable user interface elements to allow the user to provide new account information, described above, which the user provides and data consolidating log account manager 716 receives. When data consolidating log in/registration manager 712 receives such information, it stores such data associated with the new account in data consolidating account storage 618, a data consolidating (DC) account identifier, and the user's DC user identifier.

The user may also provide via suitable user interface elements provided on one or more web pages provided by data consolidating account manager 716, account organization information, described above, corresponding to any DC accounts associated with the user's DC user identifier, organizing the DC accounts in a manner that is different than the organization of DP accounts linked to the user's DP user identifier on the data providing system 550, as described above. In one embodiment, DP accounts may not be organized in any particular manner on the data providing system 550, and the user may organize DC accounts on the data consolidating system 520 hierarchically in various categories and subcategories. In one embodiment, data consolidating account manager 716 provides one or more web pages containing suitable user interface elements to allow the user to provide the account organization information, including user interface elements that allow the user to provide hierarchies, hierarchy headings (i.e. categories and subcategories) and/or hierarchy levels, and user interface elements that allow the user to assign any DC account linked to the user's DC user identifier to any category in any level or levels of any such hierarchy or hierarchies. The user provides the account organization information, and data consolidating account manager 716 receives such information and stores the account organization information in data consolidating account storage 718 associated with the user's DC user identifier and the DC account identifier corresponding to the DC account for which the account organization information is received. In one embodiment, data consolidating account manager 716 may provide user interface elements to assign a DC account to one or more categories and hierarchies when the DC account is initially being set up, and data consolidating account manager 716 may also provide the user interface elements allowing the hierarchies to be set up and/or managed by the user at any time. In one embodiment, an account may be assigned to more than one hierarchical category using such technique.

The user may request data transfer from any data providing system or systems 550 to any data consolidating system or systems 520 as described above, such as by clicking a data transfer setup link specifying data consolidating transfer setup manager 720. The data transfer setup link specifying data consolidating transfer setup manager 720 may be provided on one or more web pages provided by data providing log in/registration manager 712 or it may be provided on any web page(s) provided by any other element(s) of data providing system 550 that provides web pages, as described herein, and any links specifying any other elements(s) of data providing system 550 described herein may also be provided in a similar manner. When the user clicks the data transfer setup link specifying data consolidating transfer setup manager 720, data consolidating transfer setup manager 720 builds one or more web pages containing suitable user interface elements to allow the user to provide data transfer setup information, including the data providing (DP) system identifier corresponding to the data providing system 550 from which the user is requesting data transfer, as well as the user's DP user identifier at the data providing system 550, and returns such one or more web pages it to the user's browser in response. In one embodiment, the web page or pages provided by data consolidating transfer setup manager 720 may include a submit button or link that specifies data consolidating relay manager 722. The user provides the DP system identifier and DP user identifier, for example, by entering the DP user identifier into a text field and selecting the DP system identifier from a drop-down list of any number of data providing system identifiers known to the data consolidating system, and presses the submit button specifying data consolidating relay manager 722.

Data consolidating relay manager 722 receives the DP system identifier and DP user identifier and registers the data transfer, such as by identifying or generating a DC opaque user identifier corresponding to the requesting user's DC user identifier (e.g. retrieved via encrypted cookie as described above) as described in the related application. In one embodiment, data consolidating relay manager 722 may provide the received DP system identifier, received DP user identifier and the DC opaque user identifier it has generated and stored into data consolidating user information storage 714 or identified in data consolidating user information storage 714 as described in the related application, to matching system match setup manager 816.

In one embodiment, the data consolidating system 520 may authenticate itself to the matching system 540 using conventional authentication methods, and/or vice versa, or the two systems 520 and 540 may reciprocally authenticate to each other at any time, and all communications between the data consolidating system 520 and matching system 540 may be sent and/or received via one or more authenticated channels maintained between the two systems using conventional https techniques. In one embodiment, the two systems may also be identified to each other through such authenticated channels.

Via an authenticated channel, matching system match setup manager 816 may receive the DP system identifier, DP user identifier and DC opaque user identifier from data consolidating relay manager 722, and matching system match setup manager 816 may process the setup of data transfers between the data consolidating system user requesting data transfer and the data providing system user using opaque identifiers as described in the related application. In one embodiment, matching system match setup manager 816 stores data transfer setup information, including the DC system identifier and DC opaque identifier corresponding to the data consolidating system (identified via the authenticated channel) and data consolidating user registering the data transfer, and the DP system identifier and DP opaque identifier of the data providing system and user from which data transfer is registered, in matching system storage 814 associated with a unique setup serial number.

When data consolidating relay manager 722 and matching system match setup manager 816 have registered the transfer of data and linked the DC opaque user identifier on the data consolidating system 520 and the DP opaque user identifier on the data providing system 550, then the user on the data consolidating system 520 (i.e. the financial advisor) may provide advisor rules information, including any advisor synchronization rules, initial match rules, and/or data retrieval trigger information, as described above. In one embodiment, to matching system match setup manager 816 may build one or more web pages including samples of data previously retrieved from data providing system 550 along with suitable user interface elements to allow the user to provide advisor rules information using such samples, at least in part, as described above. Matching system match setup manager 816 may provide such user interface elements to the user via data consolidating relay manager 722, and the user may provide corresponding advisor rules information, via data consolidating relay manager 722, as described above. In one embodiment, matching system match setup manager 816 may receive the advisor rules information with the user's DC opaque identifier via data consolidating relay manager 722 via one or more authenticated channels as described above, and matching system match setup manager 816 may identify the DC system identifier based on such authenticated channel(s).

In one embodiment, advisor match rules that map data retrieved from data providing system 550 to one or more data consolidating accounts on the advisor's data consolidating system 550, as described above, may be received and stored at the matching system 540 using MS/DC account identifiers and MS/DP account identifiers (MS=matching system; DC=data consolidating system; DP=data providing system; and MS/DC is the data consolidating system account identifier stored on the matching system as described herein, including the related application), or alternate or opaque account identifiers for DC accounts and DP accounts, respectively, linked to a user's DC or DP opaque user identifier. For example, unique match rules mapping data providing accounts DP1111 and DP2222 to data consolidating accounts DC3333 and DC4444, respectively, for DC user identifier Barbara may be received by matching system match setup manager 816 (via data consolidating relay manager 722) as initial match rules associated with Barbara's DC opaque user identifier which map Barbara's DP-Account 1 and DP-Account 2 to Barbara's DC-Account A and DC-Account B, respectively. When matching system match setup manager 816 receives unique and/or non-unique match rules from the advisor via data consolidating relay manager 722, matching system match setup manager 816 may store the received match rules in matching system storage 814 associated with the setup serial number corresponding to the data transfer setup information registered above.

Matching system match setup manager 816 may also provide via data consolidating relay manager 722 a web page containing suitable user interface elements to allow the user to provide information retrieval trigger information, described above, including any trigger events that may cause the initiation of data retrieval from the data providing system, as described above and below, and data consolidating relay manager 722 forwards the web page to the user's browser. Examples of trigger events may include a specified time of day, such as 5 AM every day, or each time the user logs in to the data consolidating system, or every half-hour while the user remains logged in at the data consolidating system, and trigger events may be entered manually by the user, or selected from one or more lists of possible trigger events, or provided by the user in any other way. The user supplies such trigger information, and submits it to data consolidating relay manager 722, which forwards it to match setup manager 816. Any number of trigger events may be received corresponding to any set of data transfer setup rules received from by the user, and matching system match setup manager 816 stores each trigger event associated with the setup serial number corresponding to the data transfer setup rules for which the trigger event applies.

When a trigger event occurs, such as when the user logs in to the data consolidating system 520 if user log in at data consolidating system 520 is stored as a trigger event in matching system storage 814, or at a specified time if that time is stored as a trigger event in matching system storage 814, matching system trigger detection manager 818 may detect the occurrence of the trigger event (or matching system trigger detection manager 818 may be notified of the occurrence of the trigger event) and signal matching system data retrieval manager 830 to retrieve data corresponding to the trigger event detected. In one embodiment, if the user has set up logging in to the data consolidating system 520 as an information retrieval trigger event, data consolidator log in/registration manager 712 may provide notice of the user's log ins, such as by sending the DC opaque user identifier of the user logging in and the date and time of the log in to matching system trigger detection manager 818 via an authenticated channel described above. Matching system trigger detection manager 818 may detect information retrieval trigger events by monitoring a clock, such as an operating system clock, or by receiving user log in notice from data consolidating log in/registration manager 712, and/or by using any other trigger detection methods.

To signal matching system data retrieval manager 830 to retrieve data corresponding to the trigger event detected, matching system trigger detection manager 818 may build a trigger object, including a unique trigger serial number, the setup serial number corresponding to the data transfer setup information and detected trigger event in matching system storage 814, and the date and time of when the trigger event was detected. In one embodiment, as noted above, the setup serial number described above is associated with the DC system identifier and DC opaque user identifier of the data consolidating system and user for which data is to be retrieved, and the DP system identifier and DP opaque user identifier of the data providing system and user from which data is to be retrieved. Matching system trigger detection manager 818 sends the trigger object to matching system data retrieval manager 822. In one embodiment, matching system trigger detection manager 818 may also store the trigger object or the trigger object information in matching system data storage 820.

Matching system data retrieval manager 822 receives the trigger object and signal to retrieve data, and matching system data retrieval manager 822 retrieves data corresponding to the received trigger object. In one embodiment, matching system data retrieval manager 818 identifies in matching system storage 814 the DP system identifier and DP opaque user associated with the setup serial number included in the received trigger object, and matching system data retrieval manager 818 retrieves data providing system retrieval rules corresponding to the identified DP system identifier from matching system storage 814. Using the retrieval rules corresponding to the identified DP system identifier, matching system data retrieval manager 818 may retrieve account data from the specified data providing system 550 corresponding to the identified DP system identifier and DP opaque user identifier as described in the related application. In one embodiment, matching system data retrieval manager 818 sends a request for data to data providing API manager 630, which receives the request, retrieves the requested data from data providing account storage 618, and provides the retrieved data to matching system data retrieval manager 818, as described in the related application. In one embodiment, matching system data retrieval manager 818 sends the request for data to data providing API manager 630 along with the data and time of the last time it requested data corresponding to the same user between the same data providing system 550 and same data consolidating system 520, and data providing API manager 630 only provides data on or after that specified data and time.

In one embodiment, matching system data retrieval manager 818 also converts the retrieved data providing system data, such as into a common format as described above, using the retrieval rules, and stores the converted data in matching system data storage 820 associated with the trigger serial number included in the trigger object. When matching system data retrieval manager 822 has retrieved the data providing system account data, converted the retrieved data, and stored the converted data in matching system data storage 820, it sends the trigger object to matching system match manager 830.

Matching system match manager 830 receives the trigger object from matching system data retrieval manager 822, and matching system match manager 830 attempts to identify from the converted data corresponding to the received trigger object any uniquely matched account modification information, any matched deletion information, and/or any non-uniquely matched or unmatched account information, as described above and below. In one embodiment, matching system match manager 830 retrieves converted data corresponding to the trigger serial number included in the trigger object from matching system storage 830.

To identify uniquely matched account modification information, matched deletions, and/or non-uniquely matched or unmatched information as described above, matching system match manager 830 may retrieve from matching system storage 814, and use as described above, any advisor rules, including unique match rules and non-unique match rules, associated with the setup serial number included in the received trigger object.

For any uniquely matched account modification it identifies, matching system match manager 832 may mark the identified account modification in matching system data storage 820 as uniquely matched to a specific data consolidating account, such as by storing the MS/DC account identifier corresponding to the data consolidating account to which the account modification is uniquely matched in a unique match field associated with the identified account modification in matching system data storage 820, or marking the identified account modification as uniquely matched to a data consolidating account in any other manner.

If matching system match manager 832 has identified one or more uniquely matched account modifications, when matching system match manager 832 has marked all uniquely matched account modifications corresponding to the trigger object in matching system data storage 820, it may provide the trigger object to matching system modification manager 832 along with a signal to modify DC accounts using uniquely matched modification information.

Matching system modification manager 832 receives the trigger object and signal from matching system match manager 830, identifies the uniquely matched modification information corresponding to the received trigger object in matching system data storage 820, and modifies data consolidating system account information as described above and below. In one embodiment, matching system modification manager 832 identifies and selects the first uniquely matched modification marked with the trigger serial number included in the trigger object and identifies the MS/DC account identifier stored in the unique match field associated with the selected modification. Matching system modification manager 832 modifies the DC account that corresponds to the MS/DC account identifier using the selected modification as described above. In one embodiment, to modify the DC account, matching system modification manager 832 retrieves from matching system storage 814 and uses any synchronization rules corresponding to the DC system identifier associated with the setup serial number included in the received trigger object. Matching system modification manager 832 may also retrieve and use any advisor synchronization rules associated with the DC system identifier and DC opaque identifier in matching system storage 814 as described above, and matching system modification manager 832 may synchronize the DC account on the data consolidating system 520 via data consolidating API manager 730, which may include a conventional program application interface, and stores the data it receives into data consolidating account storage 718.

In one embodiment, data consolidating application program interface manager 730 may translate the DC opaque user identifier and MS/DC account identifier(s) corresponding to the uniquely matched account modification to it's corresponding DC account identifier in data consolidating user information storage 714 and stores the data using the DC account identifier.

In one embodiment, matching system modification manager 832 may store an indication in matching system storage 814 that any account modification information was used to synchronize DC account data on the data consolidating system 520 along with the data consolidating system identifier, data providing system identifier, DP opaque user identifier, and the date and time of when such synchronization occurred. Each request from a data providing system 550 for data resulting from a trigger event corresponding to a data consolidating system 520 for information from an account corresponding to a DP opaque identifier will specify the last such date and time as part of the request. In one embodiment, data consolidating application program interface manager 730 may record the date and time of when the DC account was synchronized in data consolidating account storage 618, and it supplies information for a user identifier since the last date and time it recorded. When matching system modification manager 832 has synchronized data consolidating account information corresponding to none, some, or all of the converted data associated with the trigger serial number and marked as uniquely matched in matching system data storage 820, it sends the trigger object to matching system match manager 830.

When matching system match manager 820 receives the trigger object from matching system modification manager 832, matching system match manager 820 attempts to identify any matched deletions in the converted data in matching system data storage 820 corresponding to the trigger serial number included in the trigger object, as described above.

If matching system match manager 830 identifies, as described above, any matched deletion in the converted data associated with the trigger serial number, matching system match manager 830 may mark the identified matched deletion as a deletion in matching system data storage 820, such as by storing the MS/DC account identifier corresponding to the DC account to which the identified deletion is matched into a matched deletion field associated with the identified deletion. In one embodiment, matching system match manager 830 marks all the matched deletions identified in the converted data corresponding to the trigger object in such manner, and if it has identified and marked one or more matched deletions corresponding to the trigger object in matching system data storage 820, matching system match manager 830 signals matching system deletion manager 834 with the trigger object.

When matching system deletion manager 834 receives the signal and trigger object from matching system match manager 830, it identifies the converted data marked as matched deletion(s) in matching system data storage 820 associated with the received trigger serial number. Matching system deletion manager 834 may also retrieve any deletion rules associated with the setup serial number included in the trigger object from matching system storage 814. Using such rules, matching system deletion manager 834 instructs data consolidating API manager 730 of the data consolidating system 520 corresponding to the trigger object to delete or mark as deleted from data consolidating account storage 718 the data consolidating system account to which any matched deletion is matched. In one embodiment, matching system deletion manager 834 retrieves the MS/DC account identifier stored in the matched deletion field associated with the matched deletion in matching system data storage 820 and instructs data consolidating API manager 730 to delete or mark as deleted the data consolidating account corresponding to the retrieved MS/DC account identifier. Matching system deletion manager 834 may also delete or mark as deleted the specified data consolidating account from matching system data storage 820 and/or otherwise indicate the matched deletion according to the retrieved deletion rules as described above.

Additionally, matching system deletion manager 834 also removes any rules information, including advisor match rules information, corresponding to any matched deletion and/or the account to which the deletion is matched from matching system storage 814, as described above. For example, if data consolidating account MS/DC1 is identified as corresponding to a matched deletion, then any unique and/or non-unique match rules or any other rules corresponding to account MS/DC1111, such as a rule mapping MS/DP3 account information to MS/DC1 may be deleted from matching system storage 814. Matching system deletion manager 834 marks the matched deletion as processed or synchronized in matching system storage 814.

When matching system deletion manager 834 has indicated deletions as described above for none, some or all of the matched deletion information it locates, deleted any rules corresponding to matched deletion information as described above in matching system storage 814, and marked matched deletion information as processed or synchronized in matching system data storage 820, it sends the trigger object back to matching system match manager 830, which receives it.

When matching system match manager 830 receives the trigger object from matching system deletion manager 834, matching system match manager 830 attempts to identify any non-uniquely matched or unmatched account information from the converted data in matching system data storage 820 that is associated with the trigger serial number included in the trigger object, as described above, and marks any such identified data in matching system data storage 820. In one embodiment, for non-uniquely matched modification information, matching system match manager 830 builds an array or list of possible account matches, including the MS/DC account identifier(s) of the DC account(s) to which the converted data is non-uniquely matched, and stores the list of possible account matches in matching system data storage 820 associated with the non-uniquely matched data. For any unmatched data it identifies and/or for any data associated with the trigger serial number that has not yet been marked as uniquely matched and/or deleted and/or non-uniquely identified, matching system match manager 830 either leaves the unmatched data unmarked or marks the unmatched data as unmatched in matching system data storage 820. If matching system match manager 830 identifies any non-uniquely matched and/or unmatched data corresponding to the trigger object in matching system data storage 820, it signals matching system unmatched signal manager 836 with the trigger object to notify the user associated with the trigger object that account information retrieved for the user is non-uniquely matched and/or unmatched, as described above.

Matching system unmatched signal manager 836 receives the signal and trigger object from matching system match manager 820 and matching system unmatched signal manager 836 attempts to notify the data consolidating user corresponding to the received trigger object for which converted data in matching system data storage 820 is marked as non-uniquely matched or unmatched. In one embodiment, matching system unmatched signal manager 836 identifies the DC system identifier and DC opaque user identifier associated with the setup serial number included in the received trigger object, and matching system unmatched signal manager 836 provides a notification message to data consolidating message manager 732 with the identified DC opaque user identifier via the authenticated communication channel that corresponds to the identified DC system identifier. The notification message may include the notification to match non-uniquely matched and/or unmatched data and a response to notification link, as described above. In one embodiment, the response to notification link in the notification message may also include the identified DC opaque user identifier corresponding to the user being notified, embedded in the link as described above. Matching system unmatched signal manager 836 provides the notification message to data consolidating message manager 732 with the DC opaque user identifier of the user to be notified, and matching system unmatched signal manager 836 may also store the notification message along with the trigger serial number corresponding to the notification in matching system storage 814 associated with the user's DC opaque user identifier.

Data consolidating message manager 732 receives the notification message and DC opaque user identifier, and data consolidating message manager 732 stores the notification message in data consolidating user information storage 714. In one embodiment, data consolidating message manager 732 identifies the DC user identifier associated with the received DC opaque user identifier in data consolidating user information storage 714 and stores the notification message in data consolidating user information storage 714 as a notification associated with the identified DC user identifier.

When the user logs in to data consolidating system 520 using user system 510 via data consolidating log in/registration manager 712 as described above, data consolidating log in/registration manager 712 may receive the user's log in information, as described above, and check data consolidating user information storage 714 for any notification message, such as the notification message to match non-uniquely matched and unmatched account information described above, that may be stored associated with the user's DC user identifier. If any such notification message to match or assign unmatched account information is stored for the user, data consolidating log in/registration manager 712 notifies the user using any conventional notification method and causes the user's user system 510 to display the notification message, including the link to respond to the notification, as described above.

The user receives the notification message at the user's user system 510, and the user may respond to the notification, such as by clicking the response to notification link. In one embodiment, the user clicks the response to notification link provided, and the user's browser on user system 510 sends the user's notification response or click to data consolidating log in/registration manager 712, which receives the user's click and builds a web page in response, as described above. In one embodiment, data consolidating log in/registration manager 712 may build a web page to cause the user's browser to request a new web page from data consolidating relay manager 722, such as by using conventional script techniques. For example, data consolidating log in/registration manager 712 may build the web page to include a script that causes the user's browser to request a new web page from data consolidating relay manager 722. In one embodiment, data consolidating log in/registration manager 712 may embed into such a script the DC opaque user identifier corresponding to the data consolidating user that is responding to the notification, as described above.

The user's browser receives the web page built by data consolidating log in/registration manager 712 and requests the new web page from data consolidating relay manager 722, such as by running the script, including the embedded DC opaque user identifier. Data consolidating relay manager 722 receives the request for the new web page along with the DC opaque user identifier embedded in the script, and data consolidating relay manager 722 sends the request to matching system user interface 842 along with the received DC opaque user identifier. In one embodiment, data consolidating relay manager 722 may optionally attempt to authenticate itself to matching system relay setup manager 840 and vice versa as described above, or data consolidating system 520 and matching system 540 may already be reciprocally authenticated to each other as described above.

Matching system user interface manager 842 receives the DC opaque user identifier from data consolidating relay manager 722, selects the first data providing system identifier associated with the user from which the response to the notification was received, and attempts to identify any non-uniquely matched account modification information retrieved from the selected data providing system associated with the received DC opaque user identifier. To select the first data providing system 550 associated with the received DC opaque identifier, matching system user interface manager 842 may identify the first notification message stored in association with the received DC opaque user identifier in matching system storage 814, and retrieve the trigger object associated with the notification message. Matching system user interface manager 842 may attempt to identify any data in matching system data storage 820 that has been associated with the trigger serial number of the trigger object and marked as non-uniquely matched as described above. If matching system user interface manager 842 identifies any such data, it signals non-unique match manager 844 with the trigger object.

If non-unique match manager 844 receives the signal and trigger object, non-unique match manager 844 retrieves non-uniquely matched account modifications in matching system data storage 820 marked as non-uniquely matched with the trigger serial number included in the trigger object. Non-unique match manager 844 retrieves any array of potential DC account matches previously stored in association with the non-uniquely matched account modification in matching system data storage 820 as described above, and provides the identified non-uniquely matched account modification information to the user via data consolidating relay manager 722 as described above. In one embodiment, non-unique match manager 844 builds one or more web pages including the non-uniquely matched account modification information, along with the potential DC account matches retrieved for the non-uniquely matched account modifications and suitable user interface elements to allow the user to provide assignment information for the non-uniquely matched account information as described above.

At the user system 510, the user receives via data consolidating relay manager 844 the potential DC account match information provided by non-unique match manager 844 and provides and submits assignment information for the non-uniquely matched data via data consolidating relay manager 722 as described above. Non-unique match manager 844 receives the user's assignment information via data consolidating relay manager 722 and adds the assignment information to the advisor match rules included in the data transfer setup information in matching system storage 814 corresponding to the trigger object.

Non-unique match manager 844 updates the account modification information in matching system data storage 820, for example, by storing an indication in matching system data storage 820 that such previously non-uniquely matched account modification information is now matched and synchronized, along with the date and time that such information was used to synchronize one or more DC accounts. In one embodiment, when non-unique match manager 844 has processed all account modification information marked as non-uniquely matched in matching system data storage 820 with the trigger serial number received from matching system user interface manager 842, non-unique match manager 844 sends the trigger object to matching system user interface manager 842 with an indication that non-uniquely matched data has been processed corresponding to the trigger object.

Matching system user interface manager 842 receives the indication and trigger object from non-unique match manager 844, even if matching system user interface manager 842 has not identified any non-uniquely matching account modification information corresponding to the trigger object above, and matching system user interface manager 842 attempts to identify any account modification information in matching system data storage 820 marked as unmatched (or not marked as uniquely matched, deleted, non-uniquely matched) and not marked as synchronized with the trigger serial number included in the trigger object. In one embodiment, unmatched account modification information may be new account information or any other account modification information for which match rules may not have been previously received as described above. If matching system user interface manager 842 identifies any such unmatched account modification information, it signals matching system match setup manager 816 with the trigger object to match unmatched account information corresponding to the trigger object.

In one embodiment, matching system match setup manager 816 receives the trigger object and identifies unmatched account modification information corresponding to the received trigger serial number in matching system data storage 820. Matching system match setup manager 816 may also retrieve from matching system storage 814 the DC system identifier and DC opaque user identifier associated with the setup serial number included in the trigger object, and matching system match setup manager 816 provides the unmatched account modification information to the user via data consolidating relay manager 722. In one embodiment, matching system match setup manager 816 may build one or more web pages including the unmatched account modification information and suitable user interface elements to allow the user to provide any advisor rules in the manner described above. The user receives the unmatched account modification information and provides additional match rules information (via data consolidating relay manager 722) for the unmatched account modification information in a manner similar to the manner in which the user provided initial match rules (via data consolidating relay manager 722) above. Matching system match setup manager 816 receives (via data consolidating relay manager 722) and stores the additional match rules corresponding to the unmatched account modification information in matching system storage 814 associated with the setup serial number included in the trigger object in a manner similar to the manner in which matching system match setup manager 816 receives and stores initial match rules above. In one embodiment, matching system setup manager 816 stores any additional match rules in matching system storage 814 with the date and time that such advisor match rules are received.

Matching system match setup manager 832 sends the trigger object to matching system match manager 830, which receives the trigger object and repeats the process identifying uniquely matched account modification information, matched deletion information, and/or non-uniquely matched or unmatched account information using account data in matching system data storage 820 that has been stored in association with the trigger serial number and not marked as synchronized.

When all account modification information corresponding to the trigger object has been processed in the manner described above and marked as synchronized in matching system data storage 814, matching system match manager 830 signals matching system user interface manager 842, which receives the signal and determines whether any additional notification messages and/or trigger objects have been stored in matching system storage 814 associated with the user's DC opaque identifier. If matching system user interface manager 842 identifies any additional trigger objects, then it selects the data providing system corresponding to the next trigger object identified and repeats the process described above for the next selected data providing system using the new trigger object. If matching system user interface manager 842 determines that no additional notification messages or trigger objects are stored in association with the DC opaque user identifier of the user responding to the notification above, then the system may terminate the process of attempting to match unmatched or non-uniquely matched data from such user.

Once a month, or once a week, or on any other basis, matching system deletion selection manager 860 may select the first DC user in matching system storage 814 and check for possible account deletions corresponding to the selected user as described above. In one embodiment, matching system deletion selection manager 860 may select the first DC opaque user identifier and DC system identifier corresponding to the first user in matching system storage 814. Matching system deletion selection manager 860 may provide the selected DC opaque user identifier and DC system identifier to matching system deletion account identifier 862.

Matching system deletion account identifier 862 receives the selected DC opaque user identifier and DC system identifier and may identify all the DC accounts associated with the selected DC opaque user identifier in matching system storage 814. In one embodiment, matching system deletion account identifier 862 may retrieve data transfer setup rules corresponding to the selected DC opaque user identifier and DC system identifier in matching system storage 814 and identify all the MS/DC account identifiers included in the retrieved data transfer setup rules. Matching system deletion account identifier 862 builds an array or list of DC accounts associated with the DC opaque user identifier. In one embodiment, each element in the list of DC accounts corresponding to the DC opaque user identifier may include the DC system identifier and MS/DC account identifier of each DC account identified for the DC opaque user identifier. Matching system deletion account identifier 862 stores the list in matching system storage 814 associated with the selected DC opaque user identifier and DC system identifier and may also provide the list of DC accounts (or pointer to the list) to matching system deletion threshold manager 864 along with the selected user's DC opaque user identifier and DC system identifier.

Matching system deletion threshold manager 864 may receive the list of DC accounts, DC opaque user identifier, and DC system identifier from matching system deletion account identifier 862 and compare the date and time of the last activity (or amount of time passed since the date and time of the last activity) corresponding to each DC account in the list of DC accounts to a last activity threshold, as described above, to determine if any account for which there has been no new activity for the threshold amount of time may possibly be an account to delete or mark as deleted, as described above. In one embodiment, matching system deletion manager 864 may receive last activity threshold information at any time, such as from a system administrator, and may store last activity threshold information internally. Matching system deletion threshold manager 864 may retrieve last activity information corresponding to each account in the list of DC accounts, including the date and time of the last activity stored corresponding to each account, from matching system storage 814.

If the last activity identified for a DC account is older than the last activity threshold, matching system deletion threshold manager 864 stores an indication that the DC account may need to be checked for deletion, such as by marking the MS/DC account identifier in the list of DC accounts in matching system storage 814 as a possible account deletion. When matching system deletion threshold manager 864 has compared the last activity corresponding to each DC account included in the list of DC accounts to the last activity threshold and marked any possible account deletions as described above, it may send the pointer to the list of DC accounts to matching system deletion indication manager 868.

Matching system deletion indication manager 868 receives the list of DC accounts and attempts to identify any DC accounts marked as possible account deletions by matching system deletion threshold manager 864. If one or more DC accounts in the list of DC accounts is marked as a possible account deletion, matching system deletion indication manager 868 instructs the data consolidating system 520 corresponding to the DC system identifier associated with the DC account marked as a possible deletion to notify the selected user at the data consolidating system 520. In one embodiment, matching system deletion indication manager 864 sends a possible deletion notification message to data consolidating API manager 730 (at data consolidating system corresponding to DC system identifier) along with the user's DC opaque user identifier. The possible account deletion notification message may include a deletion notification response link, and the link may include the selected user's DC opaque user identifier. When matching system deletion indication manager 864 has sent the possible account deletion notification message to data consolidating API manager 730, it may signal matching system deletion selection manager 860 to check for additional users.

Data consolidating API manager 730 receives any possible account deletion notification message and DC opaque user identifier from matching system deletion indication manager 864, and data consolidating API manager 730 identifies the DC user identifier that corresponds to the received DC opaque user identifier in data consolidating user information storage 714 and store the received possible account deletion notification message in data consolidating user information storage 714 associated with the identified DC user identifier.

If no DC accounts in the received list of DC accounts are marked as possible account deletions, then matching system deletion indication manager 868 may signal matching system deletion selection manager 860 to check for additional users.

Matching system deletion selection manager 860 receives the signal to check for more users from matching system deletion indication manager 864, and if there are additional users for which possible account deletions have not been processed as described above, matching system deletion selection manager 860 selects the next DC opaque user identifier and DC system identifier corresponding to the next user and sends the newly selected user DC opaque user identifier and DC system identifier to matching system deletion account identifier 862 as described above.

When no more users exist for which to process possible account deletions in the manner described above, matching system deletion selection manager 860 may wait until the next iteration of processing possible account deletions.

The user may log in, as described above, to data consolidating system 520 via data consolidating log in/registration manager 712, and data consolidating log in/registration manager 712 authenticates the user as described above notifies the user of any possible account deletions that have been identified for the user as described above. In one embodiment, to notify the user of any possible account deletions, data consolidating log in/registration manager 712 may retrieve and provide the possible account deletion notification message, including the deletion notification response link, associated with the logged-in user's DC user identifier in data consolidating account storage 718.

The user receives the possible deletion notification message and may respond to the possible deletion notification in a manner similar to the manner in which the user may respond to other notifications above, such as by clicking the deletion notification response link provided with the possible account deletion notification message. Elements 712, 722 and 840 may operate as before to relay information between the user's user system 510 and the matching system 540 as described above. Via the relay, as described above, matching system delete selection manager 880 receives the user's DC opaque user identifier, and matching system delete selection manager 880 causes the user's user system 510 to display possible account deletion information corresponding to the received DC opaque user identifier, including account information corresponding to one or more DC accounts marked as possible account deletions in matching system storage 814.

The user selects accounts deletion as described above, and matching system delete selection manager 880 receives any account deletion selections as described above. In one embodiment, the user may provide any account deletion selection on the data consolidating system 520 using one or more DC account identifiers, and matching system delete selection manager 880 may receive the user deletion selections as the MS/DC account identifier corresponding to the DC account identifier via the relay. If matching system delete selection manager 880 receives any account deletion selections, it may instruct data consolidating system 520 to delete or mark as deleted any accounts selected by the user for deletion, as described above, and remove any rules or portions of rules corresponding to the deletion selections in matching system storage 814, as described above. To instruct data consolidating system 520 to delete an account selected by the user for deletion, matching system delete selection manager 880 sends the DC opaque user identifier and MS/DC account identifier corresponding to the user's deletion selection to data consolidating API manager 730 along with an indication to delete the account or marked the account as deleted.

Data consolidating API manager 730 receives the DC opaque user identifier MS/DC account identifier from matching system delete selection manager 880, and data consolidating API manager 730 identifies the DC user identifier corresponding to the received DC opaque user identifier in data consolidating user information storage 714 and marks the DC account corresponding to the received MS/DC account identifier as deleted as described above.

Additionally, matching system delete selection manager 880 identifies and deletes any data transfer setup information corresponding to the account deletion selection, including any unique match rules or non-unique rules associated with the deletion selection, in matching system storage 814. In one embodiment, matching system delete selection manager 880 may not delete data transfer setup information corresponding to the deletion selection if it also corresponds to one or more of the user's active accounts but may remove the portion corresponding to the deleted account.

All storage elements (including 614, 620, 714, 718, 814 and 820) described herein may include conventional memory or disk storage and may include a conventional database.

In one embodiment, there may be any number of retail investors and any number of investment advisors. Each account is owned by a retail investor, and different accounts may be owned by different retail investors. Some of the retail investors may provide access to their accounts by the retail investor's investment advisor, and different retail investors may use different investment advisors, but some retail investors may use the same investment advisor as one or more other retail investors, and thus those investment advisors will have been granted access to the accounts of multiple retail investors. The investment advisor does not own such accounts, but has been hired by the retail investor to manage and/or monitor the assets in the accounts. In one embodiment, access is not granted to another investment advisor who has not been hired by the retail investor. In one embodiment, some or all investment advisors are not under control or, nor control, the party managing the data providing system, data consolidating system, or both.

Rules used for matching may generate a non unique match as described above, but in one embodiment, such rules are not identified as such by the investment advisor who supplies them when received. Although the rules may generate a non unique match between an account on the data providing system and two or more accounts on the data consolidating system, the ultimate correspondence between such accounts after manual assignment is with exactly one account on the data consolidating system in one embodiment.

SUMMARY

There is described a method of transferring account information from a first computer system to a second computer system, the method including the steps of: receiving information for obtaining information from at least two accounts at the first computer system that each have or will have a correspondence with at least one account at the second computer system, each account at the first computer system being assigned to at least one of a set of at least two users and at least one of at least two entities to which access to at least some information in each account of at least two of the users is granted, at least one of the at least two entities not operating the computer system nor on whose behalf the computer system is operated, each of the entities in the at least two entities having access to the information in at least one account of a user who is other than that entity, and to which access is not granted to any other entities of the at least two; receiving information for modifying at least two accounts on the second computer system, coupled to the first computer system via a network, each account assigned to at least one of the entities, at least some of the at least two accounts on the second computer system corresponding to not more than one of the at least two accounts on the first computer system, at least some of the at least two accounts on the second computer system being explicitly assigned a relationship with a different at least one of the at least two accounts on the second computer system, but the accounts on the first computer system to which such accounts on the second computer system correspond not having been explicitly assigned the same relationship on the first computer system; receiving information sourced by each entity describing the correspondence of each of at least one of the at least two accounts at the first computer system with a respective at least one of the accounts on the second computer system; receiving from the first computer system, account information about at least some of the at least two accounts at the first computer system to which access of at least one of the at least two entities is granted, responsive to the information for obtaining information from the at least two accounts at the first computer system received; assigning at least some of the account information received for each such account to different ones of at least some of accounts on the second computer system responsive to the information describing the correspondences received; and at least initiating a storing the at least some of the account information received on the second computer system responsive to the assigning step and the information for modifying at least two accounts on the second computer system received.

The method may contain a feature whereby the information received that is sourced by each entity describes the correspondence of an account on the first computer system with more than one account on the second computer system, for each of a set of at least one of the accounts on the first computer system.

The method may contain a feature whereby the assigning step includes: determining that the correspondence of each of the set of at least one of the account on the first computer system is with more than one account on the second computer system responsive to the correspondence information received; for each said account on the first computer system, notifying the entity that sourced said correspondence, responsive to the determining step; receiving from the entity that sourced each said correspondence, additional information regarding each said correspondence that identifies a single account on the second computer system, in response to the notifying step; and assigning at least some of the account information received for each such account to different ones of at least some of accounts on the second computer system responsive to the information describing the correspondences received and the additional information regarding said correspondence.

The method may contain a feature whereby the assigning step includes: determining that the correspondence of each of the set of at least one of the accounts on the first computer system could be with more than one account on the second computer system, even if such correspondence is actually with only one account on the second computer system; for each said account on the first computer system, notifying the entity that sourced said correspondence, responsive to the determining step; receiving from the entity that sourced each said correspondence, additional information regarding each said correspondence that identifies a single account on the second computer system, in response to the notifying step; and assigning at least some of the account information received for each such account to different ones of at least some of accounts on the second computer system responsive to the information describing the correspondences received and the additional information regarding said correspondence.

The method may contain a feature whereby the account information comprises at least one deletion of at least one account on the first computer system; and may additionally include at least initiating a deletion of at least one account on the second computer system and at least some of the information describing at least one correspondence with each of the deleted account on the first computer system, responsive to the information describing the correspondences.

The method may additionally include: identifying at least one account on the second computer system for which information describing the correspondence of each of at least one of the at least two accounts at the first computer system with said at least one account has been received but for which no assignment has been performed for a threshold amount of time; notifying the entity sourcing said correspondence information for each such account on the second computer system that such account may be a candidate for deletion; for at least some of said accounts for which such notifying was performed, receiving a confirmation from each such entity that such account on the second computer system should be deleted; and deleting each such account on the second computer system for which a confirmation was received.

There is described a system for transferring account information from a first computer system to a second computer system, the system including: a matching system administration manager having an input for receiving information for obtaining information from at least two accounts at the first computer system that each have or will have a correspondence with at least one account at the second computer system, coupled to the first computer system via a network, each account at the first computer system being assigned to at least one of a set of at least two users and at least one of at least two entities to which access to at least some information in each account of at least two of the at least two users is granted, at least one of the at least two entities not operating the computer system nor on whose behalf the computer system is operated, each of the entities in the at least two entities having access to the information in at least one account of a user who is other than that entity, and to which access is not granted to any other entities in the plurality, for receiving information for modifying at least two accounts on the second computer system, each account assigned to at least one of the entities, at least some of the at least two accounts on the second computer system corresponding to not more than one of the at least two accounts on the first computer system, at least some of the at least two accounts on the second computer system being explicitly assigned a relationship with a different at least one of the at least two accounts on the second computer system, but the accounts on the first computer system to which such accounts on the second computer system correspond not having been explicitly assigned the same relationship on the first computer system, and for receiving information sourced by each entity describing the correspondence of each of at least one of the at least two accounts at the first computer system with a respective at least one of the accounts on the second computer system, the matching system administration manager for providing at an output the information received at the matching system administration manager input; a matching system data retrieval manager having an input coupled to the matching system system administration manager for receiving the information for obtaining information from the at least two accounts at the first computer system, the matching system data retrieval manager for receiving from the first computer system via an input/output, account information about at least some of the at least two accounts at the first computer system to which access of at least one of the at least two entities is granted, responsive to the information for obtaining information from the at least two accounts at the first computer system received and for providing at an output the account information received; and a matching system match manager having an input coupled to the matching system data retrieval manager for receiving the account information and to the matching system administration manager for receiving at least some of the information describing the correspondences and at least some of the information for modifying at least two accounts on the second computer system, the matching system match manager for assigning at least some of the account information received for each such account to different ones of at least some of accounts on the second computer system responsive to the information describing the correspondences received at the matching system match manager input and for at least initiating, via an output, a storing the at least some of the account information received on the second computer system responsive to the assigning and the information for modifying at least two accounts on the second computer system received at the matching system match manager input.

The system may contain a feature whereby the information received that is sourced by each entity describes the correspondence of an account on the first computer system with more than one account on the second computer system, for each of a set of at least one of the accounts on the first computer system.

The system may contain a feature whereby: the matching system administration manager additionally provides at the matching system system administration manager output, and the matching system match manager additionally receives at the matching system match manager input, an identifier of the entity that sourced the correspondence information for at least some of the correspondence information; the matching system match manager is additionally for determining that the correspondence of each of the set of at least one of the account on the first computer system is with more than one account on the second computer system responsive to the correspondence information received at the matching system match manager input, and providing the account information having said correspondence, and each identifier of the entity that sourced the correspondence information for each said at least one account on the first computer system at the matching system match manager output; an unmatched signal manager having an input coupled to the matching system match manager output for receiving said identifier of said entity that sourced the correspondence information for each said account on the first computer system, the unmatched signal manager for notifying via an output each such entity that sourced said correspondence, responsive to the determining step; and a non unique match manager having an input for receiving from the entity that sourced each said correspondence, additional information regarding each said correspondence that identifies a single account on the second computer system, the non unique match manager input coupled to the matching system match manager output for receiving the account information, the non unique match manager input additionally coupled to the matching system administration manager output for receiving the information for modifying at least two accounts on the second computer system, the non-unique match manager for assigning at least some of the account information received for each such account to different ones of at least some of accounts on the second computer system responsive to the additional information regarding said correspondence, and for at least initiating, via an output, a storing the at least some of the account information received on the second computer system responsive to the assigning performed by the non unique match manager and the information for modifying at least two accounts on the second computer system received.

The system may contain a feature whereby: the matching system administration manager additionally provides at the matching system system administration manager output, and the matching system match manager additionally receives at the matching system match manager input, an identifier of the entity that sourced the correspondence information for at least some of the correspondence information; the matching system match manager is additionally for determining that the correspondence of each of the set of at least one of the accounts on the first computer system could be with more than one account on the second computer system, even if such correspondence is actually with only one account on the second computer system responsive to the correspondence information received at the matching system match manager input, and providing the account information having said correspondence, and each identifier of the entity that sourced the correspondence information for each said at least one account on the first computer system at the matching system match manager output; an unmatched signal manager having an input coupled to the matching system match manager output for receiving said identifier of said entity that sourced the correspondence information for each said account on the first computer system, the unmatched signal manager for notifying via an output each such entity that sourced said correspondence, responsive to the determining; and a non unique match manager having an input for receiving from the entity that sourced each said correspondence, additional information regarding each said correspondence that identifies a single account on the second computer system, the non unique match manager input coupled to the matching system match manager output for receiving the account information, the non unique match manager input additionally coupled to the matching system administration manager output for receiving the information for modifying at least two accounts on the second computer system, the non-unique match manager for assigning at least some of the account information received for each such account to different ones of at least some of accounts on the second computer system responsive to the additional information regarding said correspondence, and for at least initiating, via an output, a storing the at least some of the account information received on the second computer system responsive to the assigning performed by the non unique match manager and the information for modifying at least two accounts on the second computer system received.

The system may contain a feature whereby the account information comprises at least one deletion of at least one account on the first computer system; and the system may additionally include a matching system deletion manager having an input coupled to the matching system data retrieval manager for receiving the account information including the at least one deletion, and to the matching system system administration manager for receiving at least some of the information describing the correspondences and at least some of the information for modifying the at least two accounts on the second computer system, the matching system deletion manager for at least initiating via an output a deleting of at least one account on the second computer system responsive to the at least some of the information describing at least one correspondence with each of the deleted account on the first computer system and at least some of the information describing at least one correspondence with each deleted account on the first computer system, responsive to the information including the at least one deletion received at the matching system deletion manager input.

The system may contain a feature whereby the matching system match manager additionally provides at the matching system match manager output a date and time corresponding to the storing and an identifier of each account on the second computer system corresponding to the at least the initiating the storing; and the system may additionally include: a matching system deletion threshold manager having an input coupled to the matching system administration manager output for receiving the information sourced by each entity describing the correspondence; and to the matching system match manager output for receiving the date and time corresponding to the at least the initiating the storing and an identifier of each account on the second computer system corresponding to the at least the initiating the storing, the matching system deletion manager for identifying at least one account on the second computer system for which information describing the correspondence of each of at least one of the at least two accounts at the first computer system with said at least one account has been received but for which no at least initiating the storing has been performed for a threshold amount of time, and for providing at an output an identifier of each said account on the second computer system and for at least initiating via the matching system deletion threshold manager a notification of the entity sourcing said correspondence information for each such account on the second computer system that such account may be a candidate for deletion; and a matching system delete selection manager having an input for, for at least some of said accounts for which such notifying was performed, receiving a confirmation from each such respective entity that such account on the second computer system should be deleted; and for at least initiating via an output a deletion of each such account on the second computer system for which a confirmation was received.

There is described a computer program product including a computer useable medium having computer readable program code embodied therein for transferring account information from a first computer system to a second computer system, the computer program product including computer readable program code devices configured to cause a computer system to: receive information for obtaining information from at least two accounts at the first computer system that each have or will have a correspondence with at least one account at the second computer system, each account at the first computer system being assigned to at least one of a set of at least two users and at least one of at least two entities to which access to at least some information in each account of at least two of the at least two users is granted, at least one of the at least two entities not operating the computer system nor on whose behalf the computer system is operated, each of the entities in the at least two entities having access to the information in at least one account of a user who is other than that entity, and to which access is not granted to any other entities in the at least two; receive information for modifying at least two accounts on the second computer system, coupled to the first computer system via a network, each account assigned to at least one of the entities, at least some of the at least two accounts on the second computer system corresponding to not more than one of the at least two accounts on the first computer system, at least some of the at least two accounts on the second computer system being explicitly assigned a relationship with a different at least one of the at least two accounts on the second computer system, but the accounts on the first computer system to which such accounts on the second computer system correspond not having been explicitly assigned the same relationship on the first computer system; receive information sourced by each entity describing the correspondence of each of at least one of the at least two accounts at the first computer system with a respective at least one of the accounts on the second computer system; receive from the first computer system, account information about at least some of the at least two accounts at the first computer system to which access of at least one of the at least two entities is granted, responsive to the information for obtaining information from the at least two accounts at the first computer system received; assign at least some of the account information received for each such account to different ones of at least some of accounts on the second computer system responsive to the information describing the correspondences received; and at least initiate a storing the at least some of the account information received on the second computer system responsive to the assigning step and the information for modifying at least two accounts on the second computer system received.

The computer program product may contain a feature whereby the information received that is sourced by each entity describes the correspondence of an account on the first computer system with more than one account on the second computer system, for each of a set of at least one of the accounts on the first computer system.

The computer program product may contain a feature whereby the computer readable program code devices configured to cause the computer system to assign comprise computer readable program code devices configured to cause the computer system to: determine that the correspondence of each of the set of at least one of the account on the first computer system is with more than one account on the second computer system responsive to the correspondence information received; for each said account on the first computer system, notify the entity that sourced said correspondence, responsive to the determining step; receive from the entity that sourced each said correspondence, additional information regarding each said correspondence that identifies a single account on the second computer system, in response to the notifying step; and assign at least some of the account information received for each such account to different ones of at least some of accounts on the second computer system responsive to the information describing the correspondences received and the additional information regarding said correspondence.

The computer program product may contain a feature whereby the computer readable program code devices configured to cause the computer system to assign comprise computer readable program code devices configured to cause the computer system to: determine that the correspondence of each of the set of at least one of the accounts on the first computer system could be with more than one account on the second computer system, even if such correspondence is actually with only one account on the second computer system; for each said account on the first computer system, notify the entity that sourced said correspondence, responsive to the determining step; receive from the entity that sourced each said correspondence, additional information regarding each said correspondence that identifies a single account on the second computer system, in response to the notifying step; and assign at least some of the account information received for each such account to different ones of at least some of accounts on the second computer system responsive to the information describing the correspondences received and the additional information regarding said correspondence.

The computer program product may contain a feature whereby the account information comprises at least one deletion of at least one account on the first computer system; and may additionally include computer readable program code devices configured to cause the computer system to at least initiate a deletion of at least one account on the second computer system and at least some of the information describing at least one correspondence with each of the deleted account on the first computer system, responsive to the information describing the correspondences.

The computer program product may additionally include computer readable program code devices configured to cause the computer system to: identify at least one account on the second computer system for which information describing the correspondence of each of at least one of the at least two accounts at the first computer system with said at least one account has been received but for which no assignment has been performed for a threshold amount of time; notify the entity sourcing said correspondence information for each such account on the second computer system that such account may be a candidate for deletion; for at least some of said accounts for which such notifying was performed, receive a confirmation from each such entity that such account on the second computer system should be deleted; and delete each such account on the second computer system for which a confirmation was received.

What is claimed is:

1. A computer-implemented method of synchronizing account information on a first computer system with a second computer system, the method comprising:
  receiving, by a hardware computer processor coupled to a computer memory, the hardware computer processor coupled to at least one of the first computer system and the second computer system, information for obtaining information from a plurality of accounts at the first computer system that each have or will have a correspondence with a different at least one account of a plurality of accounts on the second computer system, each account at the first computer system being assigned to at least one of a set of a plurality of users and at least one of a plurality of entities to which access to information in each account of at least two of the plurality of users is granted, at least one of the plurality of entities not operating the first computer system nor being on whose behalf the first computer system is operated, each of the entities in the plurality of entities having access to the information in at least one account of a user who is other than that entity, and to which access is not granted to any other entities in the plurality;
  receiving, by the hardware computer processor coupled to the computer memory, information for modifying the plurality of accounts on the second computer system, coupled to the first computer system via a network, each said account assigned to at least one of the plurality of entities, each of at least two of the plurality of accounts on the second computer system corresponding to not more than one of the plurality of accounts at the first computer system, at least two of the plurality of accounts on the second computer system being explicitly assigned an organizational relationship with a different at least one of the plurality of accounts on the second computer system, the accounts at the first computer system, to which such accounts on the second computer system correspond not having been explicitly assigned a same organizational relationship with one another at the first computer system as their corresponding accounts on the second computer system;
  receiving, by the hardware computer processor coupled to the computer memory, information sourced by each entity describing the correspondence of each of at least one of the plurality of accounts at the first computer system with a respective at least one of the accounts on the second computer system;
  receiving, by the hardware computer processor coupled to the computer memory, from the first computer system, account information about at least two of the plurality of accounts at the first computer system to which access of at least one of the plurality of entities is granted, responsive to the information for obtaining information from the plurality of accounts at the first computer system received;
  determining by the hardware computer processor that the correspondence of each of a first set of at least one of the accounts at the first computer system is with no more than one account on the second computer system but, based upon the information describing the correspondence for such account, could be with more than one account on the second computer system;
  for each account in the first set at the first computer system:
    notifying by the hardware computer processor the entity that sourced said correspondence, responsive to the determining step;
    receiving from the entity that sourced each said correspondence, additional information regarding each said correspondence that identifies a single account on the second computer system, in response to the notifying step; and
  assigning a portion or all of the account information received for each such account to different ones of the at least two of the accounts on the second computer system responsive to the information describing the correspondences received and the additional information regarding said correspondence;
  for each account not in the first set at the first computer system, assigning, by the hardware computer processor coupled to the computer memory, the portion or all of the account information received for each such account to different ones of at least two of the accounts on the second computer system, responsive to the information describing the correspondences received; and
  at least initiating, by the hardware computer processor coupled to the computer memory, a storing of the portion or all of the account information of a plurality of accounts at the first computer system received on a plurality of the accounts on the second computer system responsive to a trigger event, an applicable one of the assigning steps and the information for modifying the plurality of accounts on the second computer system received.

2. The method of claim 1, wherein the information received that is sourced by each entity describes the correspondence of an account at the first computer system with more than one account on the second computer system, for each of a second set of at least one of the accounts at the first computer system.

3. The method of claim 2, wherein the assigning step comprises:
   determining that the correspondence of each of the second set of at least one of the account at the first computer system is with more than one account on the second computer system responsive to:
      the correspondence information received; and
      a failed attempt to identify a unique correspondence between the second set of at least one account at the first computer system and one account on the second computer system;
   for each said account at the first computer system notifying the entity that sourced said correspondence, responsive to said determining step;
   receiving from the entity that sourced each said correspondence, additional information regarding each said correspondence that identifies a single account on the second computer system, in response to the notifying step; and
   assigning the portion or all of the account information received for each such account to different ones of the at least two of the accounts on the second computer system responsive to the information describing the correspondence received and the additional information regarding said correspondence.

4. The method of claim 1:
   wherein the account information comprises at least one deletion of the at least one account at the first computer system; and
   additionally comprising at least initiating a deletion of at least one account on the second computer system and a part or all of the information describing at least one correspondence with each of the deleted account at the first computer system, responsive to the information describing the correspondence.

5. The method of claim 1, additionally comprising:
   identifying at least one account on the second computer system for which the information describing the correspondence of each of at least one of the plurality of accounts at the first computer system with said at least one account has been received but for which no assignment has been performed for a threshold amount of time;
   notifying the entity sourcing said correspondence information for each such account on the second computer system that such account may be a candidate for deletion;
   for at least one of said accounts for which such notifying was performed, receiving a confirmation from each such entity that such account on the second computer system should be deleted; and
   deleting each such account on the second computer system foe which a confirmation was received.

6. A system for synchronizing account information on a first computer system with a second computer system, the system comprising:
   a matching system administration manager comprising a hardware computer processor coupled to a computer memory, and having an input for receiving information for obtaining information from a plurality of accounts at the first computer system that each have or will have a correspondence with a different at least one account of a plurality of accounts on the second computer system, coupled to the first computer system via a network, each account at the first computer system being assigned to at least one of a set of a plurality of users and at least one of a plurality of entities to which access to information in each account of at least two of the plurality of users is granted, at least one of the plurality of entities not operating the first computer system nor being on whose behalf the first computer system is operated, each of the entities in the plurality of entities having access to the information in at least one account of a user who is other than that entity, and to which access is not granted to any other entities in the plurality, for receiving information for modifying the plurality of accounts on the second computer system, each said account assigned to at least one of the plurality of entities, each of at least two of the plurality of accounts on the second computer system corresponding to not more than one of the plurality of accounts at the first computer system, at least two of the plurality of accounts on the second computer system being explicitly assigned an organizational relationship with a different at least one of the plurality of accounts on the second computer system, the accounts at the first computer system, to which such accounts on the second computer system correspond not having been explicitly assigned a same organizational relationship with one another at the first computer system as their corresponding accounts on the second computer system, and for receiving information sourced by each entity describing the correspondence of each of at least one of the plurality of accounts at the first computer system with a respective at least one of the accounts on the second computer system, the matching system administration manager for providing at an output the information received at the matching system administration manager input and an identifier of the entity that sourced the correspondence information for at least a portion or all of the correspondence information;
   a matching system data retrieval manager comprising the hardware computer processor coupled to the computer memory, and having an input coupled to the matching system administration manager output for receiving the information for obtaining information from the plurality of accounts at the first computer system, the matching system data retrieval manager for receiving from the first computer system via an input/output, account information about at least some of the plurality of accounts at the first computer system to which access of at least one of the plurality of entities is granted, responsive to the information for obtaining information from the plurality of accounts at the first computer system received and for providing at an output the account information received;
   a matching system match manager comprising the hardware computer processor coupled to the computer memory, and having an input coupled to the matching system data retrieval manager output for receiving the account information and to the matching system administration manager output for receiving at least some of the information describing the correspondences and at least some of the information for modifying a plurality of accounts on the second computer system and the identifier of the entity that sourced the correspondence information for at least the portion or all of the correspondence information, the matching system match manager for assigning a portion or all of the account information received for each such account to different ones of at least two of the plurality of accounts on the second computer system responsive to the information describing the correspondences received at the matching system match manager input, for determining that the correspondence of each of a first set of at least one of the accounts at the first computer system is with no more than one account on the second computer system but, based upon the information describing the correspondence for such account, could be with more than one account on the second computer system, and for providing at a matching system match manager output the account information having said correspondence, and each identifier of the entity that sourced the correspondence information for each said at least one account in the first set at the first computer system and for at least initiating, via the matching system match manager output, a storing, on the second computer system, of the portion or all of the account information received that is not in the first set, responsive to the assigning and the information for modifying the plurality of accounts on the second computer system received at the matching system match manager input;

an unmatched signal manager having an input coupled to the matching system match manager output for receiving said identifier of said entity that sourced the correspondence information for each said account in the first set at the first computer system, the unmatched signal manager for notifying via an output each such entity that sourced said correspondence; and a non unique match manager having an input for receiving from the entity that sourced each said correspondence for each of at least one account in the first set, additional information regarding each said correspondence that identifies a single account on the second computer system, the non unique match manager input coupled to the matching system match manager output for receiving the account information, the non unique match manager input additionally coupled to the matching system administration manager output for receiving the information for modifying the plurality of accounts on the second computer system, the non unique match manager for assigning the portion or all of the account information received for each such at least one account in the first set to different ones of the at least two of the plurality of accounts on the second computer system responsive to the additional information regarding said correspondence, and for at least initiating, via an output, a storing of the portion or all of the account information received on the second computer system responsive to the assigning performed by the non unique match manager and the information for modifying the plurality of accounts on the second computer system received.

7. The system of claim 6, wherein the information received that is sourced by each entity describes the correspondence of an account at the first computer system with more than one account on the second computer system, for each of a second set of at least one of the accounts at the first computer system.

8. The system of claim 7, wherein:

the matching system administration manager additionally provides at the matching system administration manager output, and the matching system match manager additionally receives at the matching system match manager input, an identifier of the entity that sourced the correspondence information for at least the portion or all of the correspondence information;

the matching system manager is additionally for determining that the correspondence of each of the second step of at least one of the account at the first computer system is with more than one account on the second computer system responsive to an attempt to identify a unique correspondence between the second set of at least one account at the first computer system and one account on the second computer system using the correspondence information received at the matching system manager input, and providing the account information having said correspondence, and each identifier of the entity that sourced the correspondence information for each said at least one account at the first computer system at the matching system match manager output;

the unmatched signal manager is additionally for notifying via the unmatched signal manager output each such entity that sourced said correspondence; and the non unique match manager input is additionally for receiving from the entity that sourced each said correspondence, additional information regarding each said correspondence of each of at least one of the accounts in the second set that identifies a single account on the second computer system and is additionally for assigning the portion or all of the account information received for each such at least one account in the second set to different ones of that at least two of the accounts on the second computer system responsive to the additional information regarding said correspondence, and for at least initiating, via the non unique match manager output, a storing of the portion or all of the account information received on the second computer system responsive to the assigning performed by the non unique match manager and the information for modifying a plurality of accounts on the second computer system received.

9. The system of claim 6:

wherein the account information comprises at least one deletion of at least one account at the first computer system; and the system additionally comprises a matching system deletion manager having an input coupled to the matching system data retrieval manager for receiving the account information comprising the at least one deletion, and to the matching system administration manager for receiving at least a part or all of the information describing the correspondences and at least a part or all of the information for modifying the plurality of accounts on the second computer system, the matching system deletion manager for at least initiating via an output a deleting of at least one account on the second computer system responsive to the at least the part or all of the information describing at least one correspondence with each of the deleted account at the first correspondence with each deleted account at the first computer system, responsive to the information comprising the at least one deletion received at the matching system deletion manager input.

10. The system of claim 6:

wherein the matching system match manager additionally provides at the matching system match manager output a date and time corresponding to the storing and an identifier of each account on the second computer system corresponding to the at least the initiating the storing; and the system additionally comprises:

a matching system deletion threshold manager having an input coupled to the matching system administration manager output for receiving the information sourced by each entity describing the correspondence; and to the matching system match manager output for receiving the date and time corresponding to the at least the initiating the storing and an identifier of each account on the second computer system corresponding to the at least the initiating the storing, the matching system deletion manager for identifying at least one account on the second computer system for which information describing the correspondence of each of at least one of the plurality of accounts at the first computer system with said at least one account has been received but for which no at least initiating the storing has been performed for a threshold amount of time, and for providing at an output an identifier of each said account on the second computer system and for the at least initiating via the matching system deletion threshold manager a notification of the entity sourcing said correspondence information for each such account on the second computer system that such account may be a candidate for deletion; and a matching system delete selection manager having an input for, for at least one of said accounts for which such notifying was performed, receiving a confirmation from each such respective entity that such account on the second computer system should be deleted and for at least initiating via an output a deletion of each such account on the second computer system for which a confirmation was received.

11. A computer program product comprising a nontransitory computer useable medium having computer readable program code embodied therein for synchronizing account information on a first computer system with a second computer system, the computer program product comprising computer readable program code devices configured to program a hardware computer processor coupled to a computer memory to cause a computer system to:

receive information for obtaining information from a plurality of accounts at the first computer system that each have or will have a correspondence with a different at least one account of a plurality of accounts on the second computer system, each account at the first computer system being assigned tout least one of a set of a plurality of users and at least one of a plurality of entities to which access to information in each account of at least two of the plurality of users is granted, at least one of the plurality of entities not operating the first computer system nor being on whose behalf the first computer system is operated, each of the entities in the plurality of entities having access to the information in at least one account of a user who is other than that entity, and to which access is not granted to any other entities in the plurality;

receive information for modifying the plurality of accounts on the second computer system, coupled to the first computer system via a network, each said account assigned to at least one of the plurality of entities, each of at least two of the plurality of accounts on the second computer system corresponding to not more than one of the plurality of accounts at the first computer system, at least two of the plurality of accounts on the second computer system being explicitly assigned an organizational relationship with a different at least one of the plurality of accounts on the second computer system, the accounts at the first computer system, to which such accounts on the second computer system correspond not having been explicitly assigned a same organizational relationship with one another at the first computer system as their corresponding accounts on the second computer system;

receive information sourced by each entity describing the correspondence of each of at least one of the plurality of accounts at the first computer system with a respective at least one of the accounts on the second computer system;

receive from the first computer system, account information about at least some of the plurality of accounts at the first computer system to which access of at least one of the plurality of entities is granted, responsive to the information for obtaining information from the plurality of accounts at the first computer system received;

determine that the correspondence of each of a first set of at least one of the accounts at the first computer system is with no more than one account on the second computer system but, based upon the information describing the correspondence for such account, could be with more than one account on the second computer system;

for each account in the first set at the first computer system:
  notify the entity that sourced said correspondence, responsive to the determining;
  receive from the entity that sourced each said correspondence, additional information regarding each said correspondence that identifies a single account on the second computer system, in response to the notifying; and assign a portion or all of the account information received for each such account to different ones of the at least two of the accounts on the second computer system responsive to the information describing the correspondences received and the additional information regarding said correspondence;

for each account not in the first set at the first computer system, assign the portion or all of the account information received for each such account to different ones of at least some of accounts on the second computer system responsive to the information describing the correspondences received; and at least initiate a storing on the second computer system the portion or all of the account information received responsive to all said computer readable program code devices that assign and the information for modifying the plurality of accounts on the second computer system received.

12. The computer program product of claim 11, wherein the information received that is sourced by each entity described the correspondence of an account at the first computer system with more than one account on the second computer system, for each of a second set of at least one of the accounts at the first computer system.

13. The computer program product of claim 12, wherein the computer readable program code devices configured to case the computer system to assign comprise computer readable program code devices configured to cause the computer system to:

determine that the correspondence of each of the second set of at least one of the account at the first computer system is with more than one account on the second computer system responsive to:
determine that the correspondence of each of the second set of at least one of the account at the first computer system is with more than one account on the second computer system responsive to:
the correspondence information received; and
an attempt to identify a unique correspondence between the second set of at least one account at the first computer system and one account on the second computer system;
for each said account at the first computer system, notify the entity that sourced said correspondence, responsive to said determining;
receive from the entity that sourced each said correspondence, additional information regarding each said correspondence that identifies a single account on the second computer system, in response to the notifying; and
assign the portion or all of the account information received for each such account to different ones of the at least two of the accounts on the second computer system responsive to the information describing the correspondences received and the additional information regarding said correspondence.

14. The computer program product of claim 11:
wherein the account information comprises at least one deletion of at least one account at the first computer system; and
additionally comprising computer readable program code devices configured to cause the computer system to at least initiate a deletion of at least one account on the second computer system and a part or all of the information describing at least one correspondence with each of the deleted account at the first computer system, responsive to the information describing the correspondences.

15. The computer program product of claim 11, additionally comprising computer readable program code devices configured to cause the computer system to:
identify at least one account on the second computer system for which information describing the correspondence of each of at least one of the plurality of accounts at the first computer system with said at least one account has been received but for which no assignment has been performed for a threshold amount of time;
notify the entity sourcing said correspondence information for each such account on the second computer system that such account may be a candidate for deletion;
for at least one of said accounts for which such notifying was performed, receive a confirmation from each such entity that such account on the second computer system should be deleted; and
delete each such account on the second computer system for which a confirmation was received.

* * * * *